US012186780B2

(12) United States Patent
Serstad et al.

(10) Patent No.: US 12,186,780 B2
(45) Date of Patent: Jan. 7, 2025

(54) MULTI-SYSTEM SINGLE FOOTPRINT SORTER USING ROBOTS WITH SORT VERIFICATION

(71) Applicant: Tompkins Robotics, Inc., Orlando, FL (US)

(72) Inventors: James M. Serstad, Orlando, FL (US); Michael C. Futch, Orlando, FL (US)

(73) Assignee: Tompkins Robotics, Inc., Orlando, FL (US)

( * ) Notice: Subject to any disclaimer, the term of this patent is extended or adjusted under 35 U.S.C. 154(b) by 0 days.

(21) Appl. No.: 18/603,377

(22) Filed: Mar. 13, 2024

(65) Prior Publication Data

US 2024/0316597 A1 Sep. 26, 2024

Related U.S. Application Data

(63) Continuation of application No. PCT/US2024/019413, filed on Mar. 11, 2024.

(60) Provisional application No. 63/491,182, filed on Mar. 20, 2023.

(51) Int. Cl.
*B07C 5/36* (2006.01)
*B07C 5/04* (2006.01)

(52) U.S. Cl.
CPC ................ *B07C 5/361* (2013.01); *B07C 5/04* (2013.01); *B07C 2501/0063* (2013.01)

(58) Field of Classification Search
CPC .... B07C 3/06; B07C 3/08; B07C 5/04; B07C 5/361; B07C 2501/0063; B65G 1/0492; B65G 1/06; B65G 1/065; B65G 1/137; G06Q 10/08; G06Q 10/083; G05D 1/692
See application file for complete search history.

(56) References Cited

U.S. PATENT DOCUMENTS

| | | | | |
|---|---|---|---|---|
| 7,991,505 B2* | 8/2011 | Lert, Jr. | B65G 1/0492 700/214 |
| 11,254,506 B1* | 2/2022 | Robin | B07C 3/18 |
| 11,759,826 B1* | 9/2023 | Baring | B65G 1/1373 414/807 |
| 11,892,825 B2* | 2/2024 | Zhu | B07C 3/18 |
| 2017/0183158 A1* | 6/2017 | Zhu | B65G 1/0492 |
| 2020/0002094 A1* | 1/2020 | Schedlbauer | G06Q 10/0836 |
| 2021/0387812 A1* | 12/2021 | Li | B07C 5/36 |
| 2023/0137545 A1* | 5/2023 | Austrheim | B65G 1/0485 414/279 |
| 2023/0241647 A1* | 8/2023 | Mishina | B07C 5/36 209/606 |
| 2023/0249914 A1* | 8/2023 | Fosnight | G06Q 10/087 700/214 |

(Continued)

*Primary Examiner* — Joseph C Rodriguez
(74) *Attorney, Agent, or Firm* — Parthiban A Mathavan

(57) ABSTRACT

Multi-function sorting system for use in a sorting operation includes a server, a sortation engine, and first and second function sorting systems. First function sorting system for sorting articles includes first function vehicles traversing a first function platform for transporting and depositing first function articles into first sort receptacles. Second function sorting system for sorting articles includes second function vehicles traversing a second function platform spaced apart from the first function platform for transporting and depositing second function articles into second sort receptacles. The second function platform is arranged above the first function platform in a vertical stacked configuration.

19 Claims, 18 Drawing Sheets

(56) References Cited

U.S. PATENT DOCUMENTS

| | | | | |
|---|---|---|---|---|
| 2023/0271785 | A1* | 8/2023 | Gravelle | G06Q 10/087 700/216 |
| 2023/0382645 | A1* | 11/2023 | Lan | B65G 1/1378 |
| 2024/0190658 | A1* | 6/2024 | Lindbo | B65G 1/1375 |
| 2024/0198389 | A1* | 6/2024 | Liu | B25J 11/008 |

* cited by examiner

MULTI-SYSTEM SINGLE FOOTPRINT SORTER USING ROBOTS WITH SORT VERIFICATION

CROSS-REFERENCE TO RELATED APPLICATIONS

This application claims priority to U.S. Provisional Patent Application No. 63/491,182 filed on Mar. 20, 2023, entitled "MULTI-SYSTEM SINGLE FOOTPRINT SORTER USING ROBOTS WITH SORT VERIFICATION," the entire contents of which are incorporated by reference herein.

TECHNICAL FIELD

The present invention relates to article delivery technologies, and specifically to systems and methods for automated order consolidation sortation and shipping sortation using robots and robotic vehicles in order fulfillment facilities.

BACKGROUND ART

Automated fulfillment of customer orders is becoming ubiquitous with more businesses opting for automated filling operations to achieve economies of scale and to improve the overall efficiency of order fulfillment. However, space limitations pose a challenge to fitting all order filling equipment within a limited footprint particularly when expanding the footprint is impracticable or prohibitively expensive. Accordingly, a need exists for a solution that would permit an automated fill system to expand capacity in a reliable and cost-effective manner.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more implementations, a multi-function sorting system for use in a sorting operation comprises a server. The server comprises a memory, a processor, and a sortation engine. The system further comprises a first function sorting system for sorting articles. The first function sorting system comprises a plurality of first function vehicles traversing a first function platform for transporting and depositing first function articles into first sort receptacles, and a first function article information acquisition device electronically coupled to the server. The system further comprises a second function sorting system for sorting articles. The second function sorting system for sorting articles comprises a plurality of second function vehicles traversing a second function platform spaced apart from the first function platform for transporting and depositing second function articles into second sort receptacles. The second function platform is arranged above the first function platform in a vertical stacked configuration.

According to at least one embodiment, an output of the first function sorting system is provided as an input to the second function sorting system; or, wherein an output of the second function sorting system is provided as an input to the first function sorting system. According to at least one embodiment, the first function sorting system is configured for order consolidation. According to at least one embodiment, the second function sorting system is configured for consolidating for parcel sortation. According to at least one embodiment, the first function platform is positioned above the second function platform in a vertical stacked configuration. According to at least one embodiment, the first function sorting system is configured for store pick-up ecommerce sortation, and wherein the second function sorting system is configured for store replenishment sortation. According to at least one embodiment, the first function sorting system is configured for sorting of consumer goods to an automated packing machine, and wherein the second function sorting system is configured for sorting of an output of the automated packing machine to one of: shipping containers and gaylords. According to at least one embodiment, an output of the first function sorting system and an output of the second function sorting system are combined and provided as an input to a third function sorting system. According to at least one embodiment, outputs of one or more of the first and second function sorting systems are provided as an input to a third function sorting system. According to at least one embodiment, the first function sorting system is configured for sorting of articles above a threshold size, wherein the second function sorting system is configured for sorting of articles below the threshold size. According to at least one embodiment, outputs of one or more of the first and second function sorting systems are provided as an input to a wall of sorting cubbies for an operator to transfer all articles associated with each customer order to a respective sorting cubby. According to at least one embodiment, outputs of one or more of the first and second function sorting systems are provided as an input to a conveyor or a lift for delivery to a third function sorting system. According to at least one embodiment, outputs of one or more of the first and second function sorting systems are provided as an input to an induction lift for delivery to a third function sorting system. According to at least one embodiment, outputs one or more of the first and second function sorting systems are provided as an input to a single belt conveyor positioned adjacent to a floor level for delivery to an automated packing machine. According to at least one embodiment, an output of the automated packing machine is provided as an input to a lift for delivery to a third function sorting system configured for parcel sorting. According to at least one embodiment, the first function sorting system is configured for item sortation, wherein the second function sorting system is configured for parcel sortation, wherein an output of the first function sorting system is provided as an input to the second function sorting system, and wherein an output of the second function sorting system is provided as input to an automated packing machine. According to at least one embodiment, an output of the first function sorting system is provided as an input to a lift for delivery to the second function sorting system configured for ecommerce order fulfillment. According to at least one embodiment, outputs of one or more of the first and second function sorting systems are provided as an input to a lift for delivery to a third function sorting system configured for store replenishment. According to at least one embodiment, the system further comprises a light curtain provided at one or more of: the first sort receptacles, the second sort receptacles, the first function vehicles, and the second function vehicles. According to at least one embodiment, the second function sorting system further comprises a second function article information acquisition device electronically coupled to the server.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems, and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Figure 1:
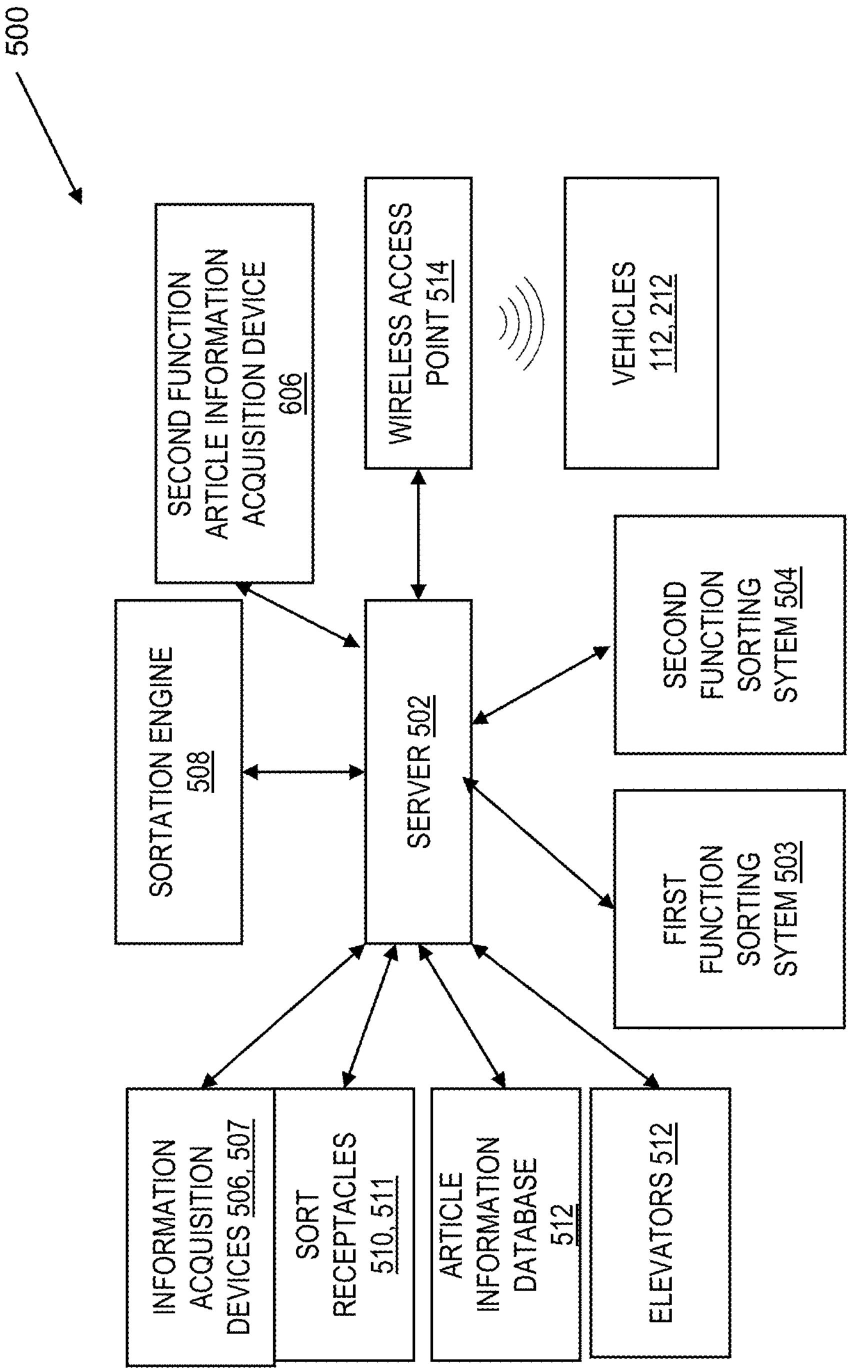
FIG. 1 illustrates a block diagram of an exemplary system 500 for use in directing sorting operations in a centralized or localized sorting facility, according to at least one embodiment of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Centralized fulfillment of customer orders is becoming ubiquitous with more businesses opting for semi-automated or substantially automated filling operations to achieve economies of scale and to improve the overall efficiency of order fulfillment. However, space limitations often pose a challenge to fitting all order filling equipment within a fixed footprint particularly when expanding the footprint is impracticable or prohibitively expensive.

Embodiments disclosed herein overcome the limitations associated with limited space availability for automated order fill operations by providing for a “two-system on same footprint” concept, a “three-system on same footprint” concept, or a “four-system on same footprint” concept, each of which alternately being referred to hereinafter as “multi-function sorter system”, “multi-function sorter”, or for the sake of brevity as just “system”. Further, whereas embodiments disclosed herein also allow for more than two-systems on a same footprint, for sake of simplicity, the embodiments of the invention may be described with reference to a two-system on same footprint set-up.

Embodiments of the presently disclosed subject matter further provide for a solution that can permit an automated central fill multi-function sorter system to operate in a reliable and cost-effective manner. Embodiments disclosed herein can further provide for one or more of: detection, correction, reduction, and elimination of errors in automated fulfilling of prescription orders. Embodiments disclosed herein can accordingly provide for improved accuracy in automated fulfilling of prescription orders than what is possible under existing methods. Embodiments disclosed herein can further provide for an improved automation solution by way of a prescription order consolidation and shipping sortation in one combined footprint.

According to various embodiments of the disclosed subject matter, provided herein are systems, methods, and apparatus for directing, managing, and controlling two-system or two-function sortation of various articles including prescription medications in a centralized or localized sorting operation; also provided herein are systems, methods, and apparatus for the enhanced verification of prescription drug containers being sorted.

According to at least one embodiment, as shown in FIG. 1, system 500 comprises, among others, a control server such as server 502, a first function sorting system 503 for sorting a first set of items such as first function articles 20, and a second function sorting system for sorting a second set of items such as second function articles 24. In one embodiment, second function platform 18 is arranged above first function platform 16 in a vertical stacked configuration on a same footprint whereby the total footprint needed for both systems is equal to the footprint needed for one of those two systems; optionally, the total footprint needed for both systems is equal to just the footprint needed for the larger of two those systems. Server 502 comprises, among others, a memory, and a processor. System 500 further comprises a sortation engine for assisting the sorting operations such as sortation engine 508. System 500 also comprises a plurality of computer-controlled transport vehicles such as first function vehicles 112 as well as second function vehicles 212. In at least one embodiment, the first function vehicles 112 and second function vehicles 212 are AMRs (automated mobile robots). First function vehicles 112 traverse a first function platform 16 for transporting and depositing first function articles 20 (including articles such as prescription drug containers 20*a* shown in FIG. 8B) into first sort receptacles 510. In one embodiment, each first sort receptacle 510 corresponds to a customer order wherein server 502 associates each first sort receptacle 510 with a respective customer order.

According to one embodiment, first function platform 16 is positioned above second function platform 18 in a vertical stacked configuration; in various embodiments, the first function platform 16 and second function platform 18 occupy or require a same or similar footprint or floor area underneath them due to the vertically stacked configuration. For example, in one embodiment, if first function platform 16 has an area of n square feet, and second function platform 18 has an area of m square feet, the total footprint of floor area needed to accommodate both first function platform 16 and second function platform 18 is approximately or substantially equal to n square feet or m square feet, but is advantageously not equal to m+n square feet.

System 500 further comprises at least one first information acquisition device 506 and optionally one or more second information acquisition devices 507; each of the first information acquisition devices 506 and the optional second information acquisition devices 507 is electronically coupled to server 502 with first information acquisition devices 506 and the optional second information acquisition devices 507 operating to acquire information present on a tag or label such as tag 22 present on first function article 20. In at least one embodiment, system 500 only includes one or more first information acquisition devices 506 but no second information acquisition devices 507. System 500 optionally further comprises at least one second function article information acquisition device 606 electronically coupled to server 502 with second function article information acquisition device 606 operating to acquire information present on a tag or label such as label 26 present on second function article 24. In at least one embodiment, the second function article information acquisition device 606 is omitted with the article identity conveyed electronically by the first function sorting system to the second function sorting system.

In various embodiments, system 500 for use in a multi-function sorting operation comprises server 502 comprising a memory, a processor, sortation engine 508, first function sorting system 503 comprising a plurality of first function vehicles 112 traversing a first function platform 16 for transporting and depositing first function articles 20 into first sort receptacles 510, and first information acquisition devices 506 and optional second information acquisition devices 507 electronically coupled to server 502. System 500 may further optionally comprise at least one second function article information acquisition device 606. The first function sorting system 503 further comprises first function article induction station 14 where first function articles are inducted onto first function vehicles. System 500 further comprises second function sorting system 504 comprising a plurality of second function vehicles 212 traversing a second function platform 18 spaced apart from the second function platform 18 for transporting and depositing second function articles 24 into second sort receptacles 511, and one or more second function article information acquisition devices 606 electronically coupled to server 502. In one embodiment, the second function platform 18 is arranged above first function platform 16 in a vertical stacked configuration. The second function sorting system 504 further comprises a second function article induction station 114 where second function articles 24 are inducted onto second function vehicles 212. According to at least one embodiment, each of the second function platform 18 and first function platform 16 have no openings formed thereon.

According to one embodiment, an output of the first function sorting system 503 is provided as an input to the second function sorting system 504. According to one embodiment, an output of the second function sorting system 504 is provided as an input to the first function sorting system 503. According to one embodiment, the first function sorting system 503 is configured for order consolidation sortation wherein articles, for e.g., prescription medication or drug containers, are delivered to receptacles with each receptacle receiving all articles belonging to one order and wherein the second function sorting system is configured for shipping sortation, alternately referred to as parcel sortation, wherein letters or parcels (i.e., articles) with addresses on them are delivered to receptacles with each receptacle corresponding to a delivery zone or route.

According to at least one embodiment, the first function sorting system 503 is configured for store pick-up ecommerce sortation, and the second function sorting system 504 is configured for store replenishment sortation. According to one embodiment, the first function sorting system 503 is configured for sorting of consumer goods such as, for e.g., apparel to an automated packing machine (such as, for e.g., an auto bagger or an auto boxer), and the second function sorting system 504 is configured for sorting of an output of the automated packing machine to one of: shipping containers and gaylords. Accordingly, in one embodiment, the multi-function sorter system advantageously includes an auto bagger. As used herein, “auto bagger” refers to automated packing machine, alternately referred to as automatic bagging machines, automatic baggers, auto boxers or auto baggers, are a type of packaging equipment that quickly and effectively fill products into a poly bag or another container or receptacle. Auto baggers are one type of automated packaging equipment which may include automated boxers, carton erectors and the like.

According to one embodiment, an output of the first function sorting system 503 and an output of the second function sorting system 504 are combined together and provided as an input to a third function sorting system. According to one embodiment, an output of one of the first function sorting system 503 and the second function sorting system 504 is provided as an input to a third function sorting system; according to one embodiment, the third function sorting system is configured for parcel sortation. According to one embodiment, the first function sorting system 503 is configured for sorting of articles above a threshold size, the second function sorting system 504 is configured for sorting of articles below the threshold size, and the outputs of the first and second function sorting systems are provided as an input for placing into a put wall. As used herein, “put wall” refers to a series of dedicated shelving that increase efficiency during the order consolidation process. Put walls can handle a large volume of orders in a small footprint by allowing an operator to manually put items into cubbies on the wall, each cubby being associated with one order. This process streamlines the supply chain by increasing order accuracy and reducing walking to and from inventory storage. In one embodiment, outputs of the first and second function sorting systems are provided as an input to a wall of sorting cubbies (e.g., a put wall) for an operator to transfer all articles associated with each customer order to a respective sorting cubby.

According to one embodiment, an output of the second function sorting system 504 is provided as an input to a conveyor or a lift for delivery to a third function sorting system. According to one embodiment, outputs of the first and second function sorting systems are provided as an input to an induction lift for delivery to a third function sorting system configured for parcel sorting. As used herein, “induction lift” refers to an induction system including a lift for carrying an inducted item to a different level than the inducted level where a different system such as AMRs, conveyors, or similar other material transfer or material handling systems can move or carry the inducted item to an intended location. The induction into the induction lift can be performed manually or in an automated manner. The induction lift may have the ability to go up to 5 sortation levels high to further reduce the footprint of the overall system. The induction lift operates to generate more volume in a multi-level system as AMRs can be spread across a larger surface area. This allows greater throughput capabilities and creates larger batch pick opportunities for an order fulfillment system since the lift eliminates the need to create separate batches for each level.

According to one embodiment, outputs of the first and second function sorting systems are provided as an input to a single belt conveyor positioned adjacent to a floor level for delivery to an automated packing machine. In other words, the single belt conveyor may be positioned close to the floor level whereby in one embodiment the single belt conveyor is positioned right below the first function platform 16 or second function platform 18. According to one embodiment, an output of the automated packing machine is provided as an input to an induction lift for delivery to a third function sorting system configured for parcel sorting. According to one embodiment, an output of the first function sorting system is provided as an input to an induction lift for delivery to a third function sorting system configured for parcel sorting. According to one embodiment, the first function sorting system 503 is configured for item sortation and the second function sorting system 504 is configured for parcel sortation, wherein an output of the first function sorting system 503 is provided as an input to the second function sorting system 504, and optionally wherein an output of the second function sorting system is provided as input to an automated packing machine. According to one embodiment, an output of the first function sorting system 503 is provided as an input to an induction lift for delivery to the second function sorting system 504 configured for ecommerce order fulfillment. According to one embodiment, an output of the first function sorting system is provided as an input to an induction lift for delivery to a third function sorting system configured for store replenishment.

According to one embodiment, system 500 further comprises a photoelectric sensor such as, for e.g., a light curtain, provided at each of the first sort receptacles 510 and/or at each of the second sort receptacles 511. In one embodiment, the light curtain operates to confirm whether a positive deposition of an article from a vehicle (such as, for e.g., first function vehicles 112 or second function vehicles 212) into a receptacle (such as, for e.g., first sort receptacle 510) has occurred or not. In one embodiment, every one of the first sort receptacles 510 and every one of the second sort receptacles 511 is provided with light curtain facilities. In one embodiment, the light curtain is installed outside of the first sort receptacle 510 in order that it can properly track the filling of the first sort receptacle 510. System 500 is in communication with the light curtains such that system 500 is aware of the filling rate of each first sort receptacle 510 as well as when a first sort receptacle 510 is full and therefore in need of replacement.

According to one embodiment, system 500 comprises a light curtain provided at each of the first function vehicles 112 and the second function vehicles 212. These light curtains may operate to confirm whether a positive deposition of an article from the transport vehicle into a receptacle has occurred or not; these light curtains may operate to track the filling of receptacles such as first sort receptacle 510. System 500 is in wireless or wired communication with the light curtains aboard the transport vehicles such that system 500 is aware of the filling rate of each first sort receptacle 510 as well as when a first sort receptacle 510 is full and therefore in need of replacement.

Embodiments disclosed herein thus provide for a multi-function sorting system such as system 500 for use in directing a multi-system sorting operation. In at least one embodiment, system 500 comprises: server 502 comprising a memory, a processor, sortation engine 508, a first function sorting system 503 for sorting a first set of items such as first function articles 20 and a second function sorting system for sorting a second set of items such as second function articles 24. Accordingly, in one embodiment, first function sorting system 503 operates to sort first function articles 20 and second function sorting system operates to sort second function articles 24; in one alternate embodiment, first function sorting system 503 operates to sort second function articles 24 and second function sorting system operates to sort first function articles 20. First function sorting system 503 for sorting articles comprises a plurality of first function vehicles such as first function vehicle 112 traversing a first function platform 16 for transporting and depositing items such as first function articles 20 into first sort receptacles 510, and an article information acquisition device such as first information acquisition device 506 electronically coupled to server 502. Second function sorting system 504 for sorting second function articles such as packages may comprise a plurality of second function vehicles such as second function vehicle 212 traversing a second function platform 18 for transporting and depositing items such as second function articles 24 into second sort receptacles 511, and an optional second function article information acquisition device 606 such as, for e.g., a package information acquisition device electronically coupled to server 502. In various embodiments, the first function platform and the second function platform are positioned one above the other within the same floor area. Second function vehicles 212 accordingly traverse second function platform 18 for transporting and depositing second function articles 24 into second sort receptacles 511.

In at least one embodiment, an output of the first function sorting system 503 is provided as an input to the second function sorting system 504; alternately, in at least one embodiment, an output of the second function sorting system 504 may be provided as an input to the first function sorting system 503. In one embodiment, as shown in FIG. 3, second function platform 18 is positioned above first function platform 16; alternately, in one embodiment, first function platform 16 is positioned above second function platform 18.

Figure 2:
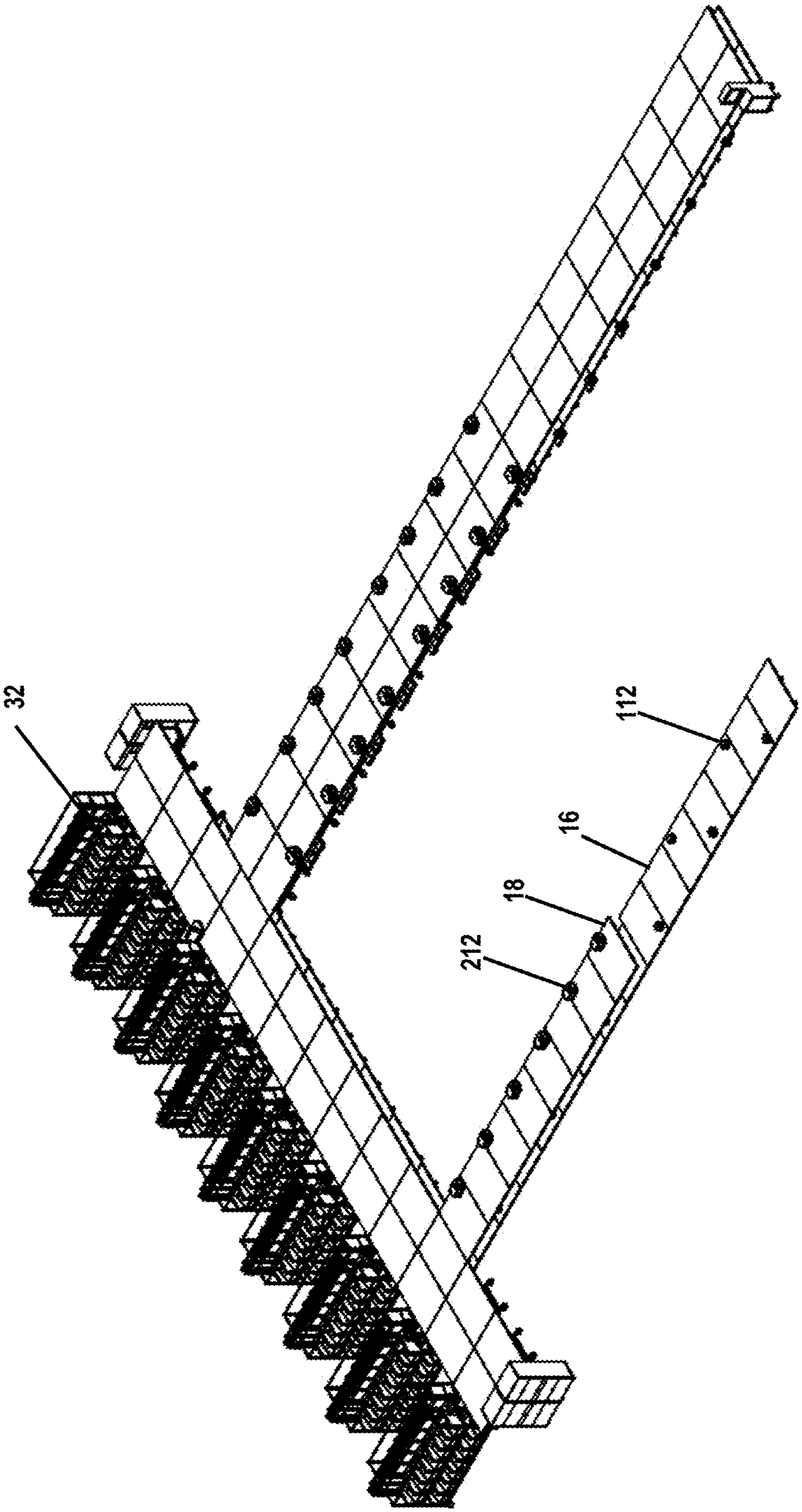
FIG. 2 illustrates an example implementation of the system of FIG. 1 that comprises first and second platforms along with sort shelf banks providing enhanced sorting capability, according to one or more implementations of the presently disclosed subject matter.
Figure 3:
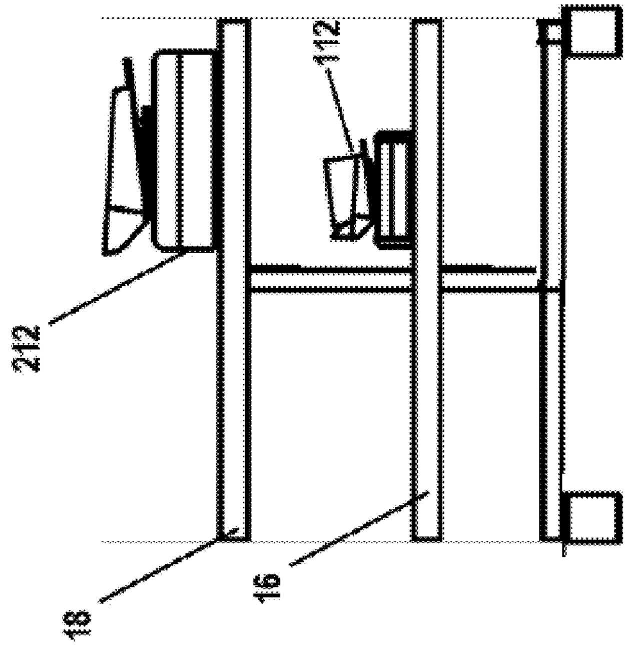
FIG. 3 illustrates a side profile cross-sectional view of a portion of the first and second platforms of FIG. 2, according to at least one embodiment of the presently disclosed subject matter.

FIG. 3 illustrates a side profile cross-sectional view of a portion of the first and second platforms of FIG. 2, according to at least one embodiment of the presently disclosed subject matter. FIG. 3 further illustrates a second function vehicle 212 traversing second function platform 18 for transporting and depositing second function articles 24 into second sort receptacles 511. FIG. 3 also illustrates a first function vehicle 112 traversing first function platform 16 for transporting and depositing first function articles 20 into order receptacles such as first sort receptacles 510. In the FIG. 3 embodiment, second function platform 18 is positioned right above first function platform 16 such that both second function platform 18 and first function platform 16 occupy a same footprint; for e.g., second function platform 18 and first function platform 16 occupy a same or similar square footage of the floor or ground.

Figure 4:
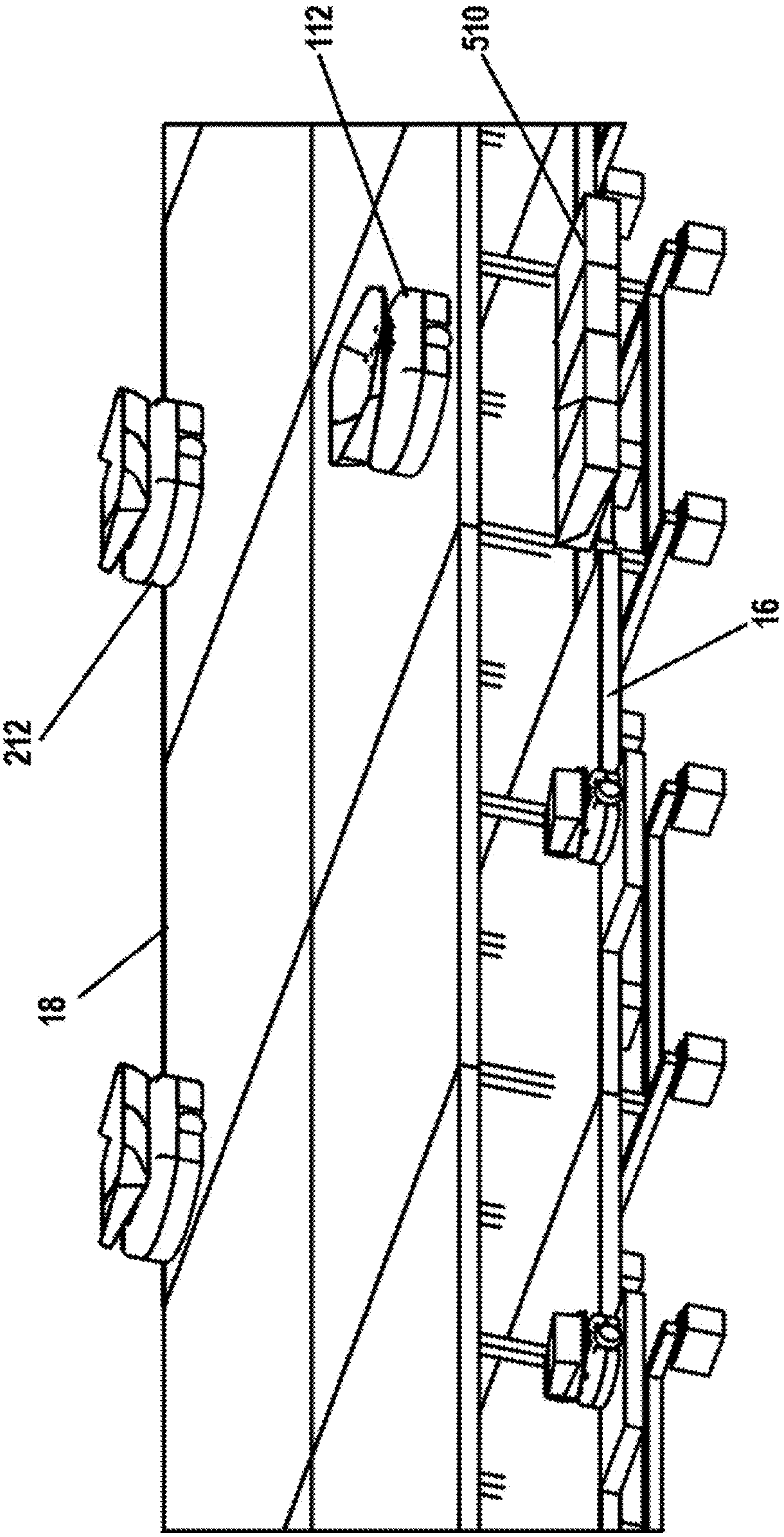
FIG. 4 illustrates a side perspective view of a portion of the first and second platforms of FIG. 2, according to at least one embodiment of the presently disclosed subject matter.

FIG. 4 illustrates a side perspective view of a portion of the first and second platforms of FIG. 2, according to at least one embodiment of the presently disclosed subject matter. FIG. 4 shows first function vehicles 112 traversing a first function platform 16 for transporting and depositing first function articles 20 into a bank of first sort receptacles 510. FIG. 4 further illustrates second function vehicles 212 traversing second function platform 18 positioned above first function platform 16.

Figure 5:
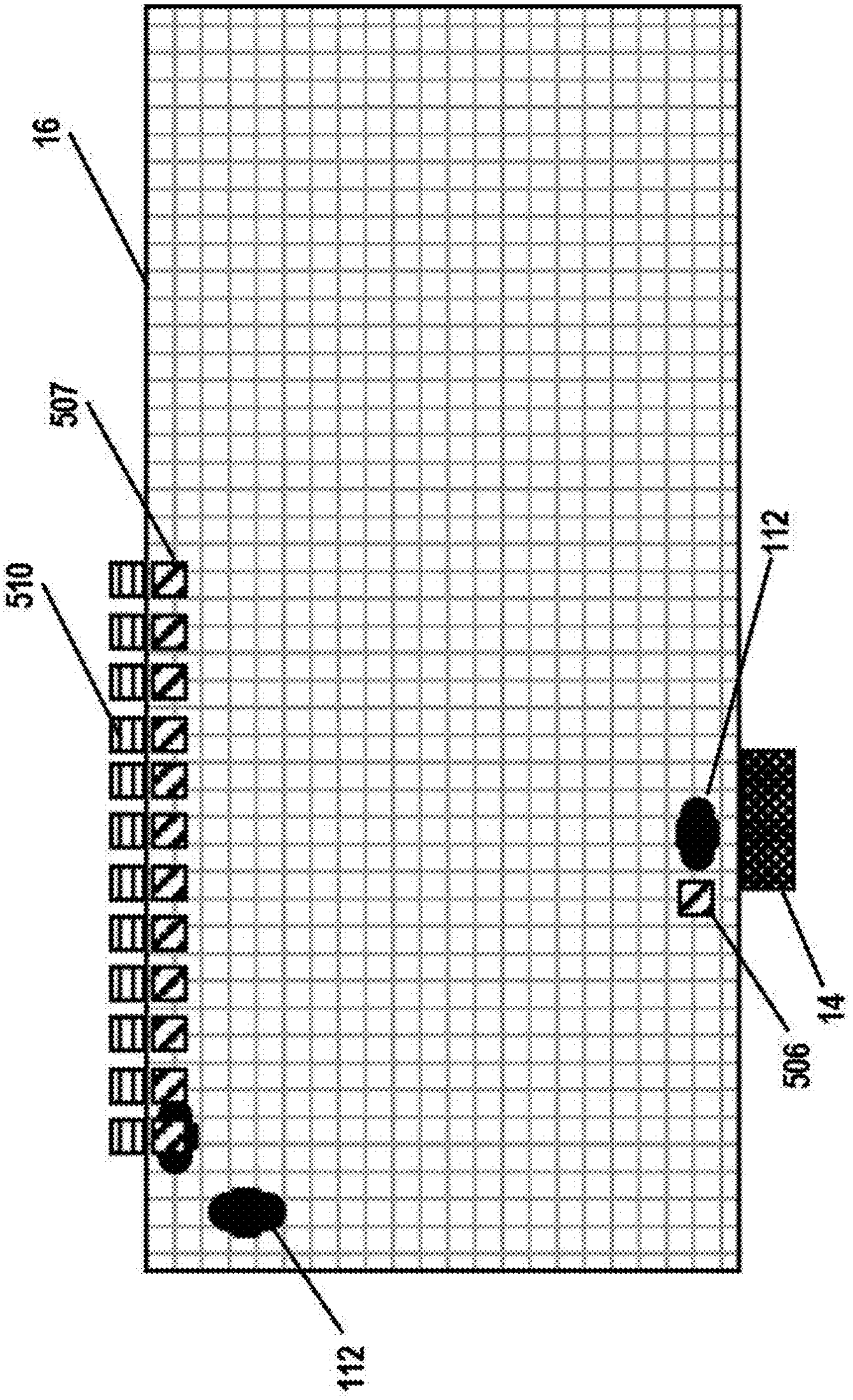
FIG. 5 illustrates a top schematic view of a portion of the first function platform of FIG. 2, according to at least one embodiment of the presently disclosed subject matter.
Figure 6:
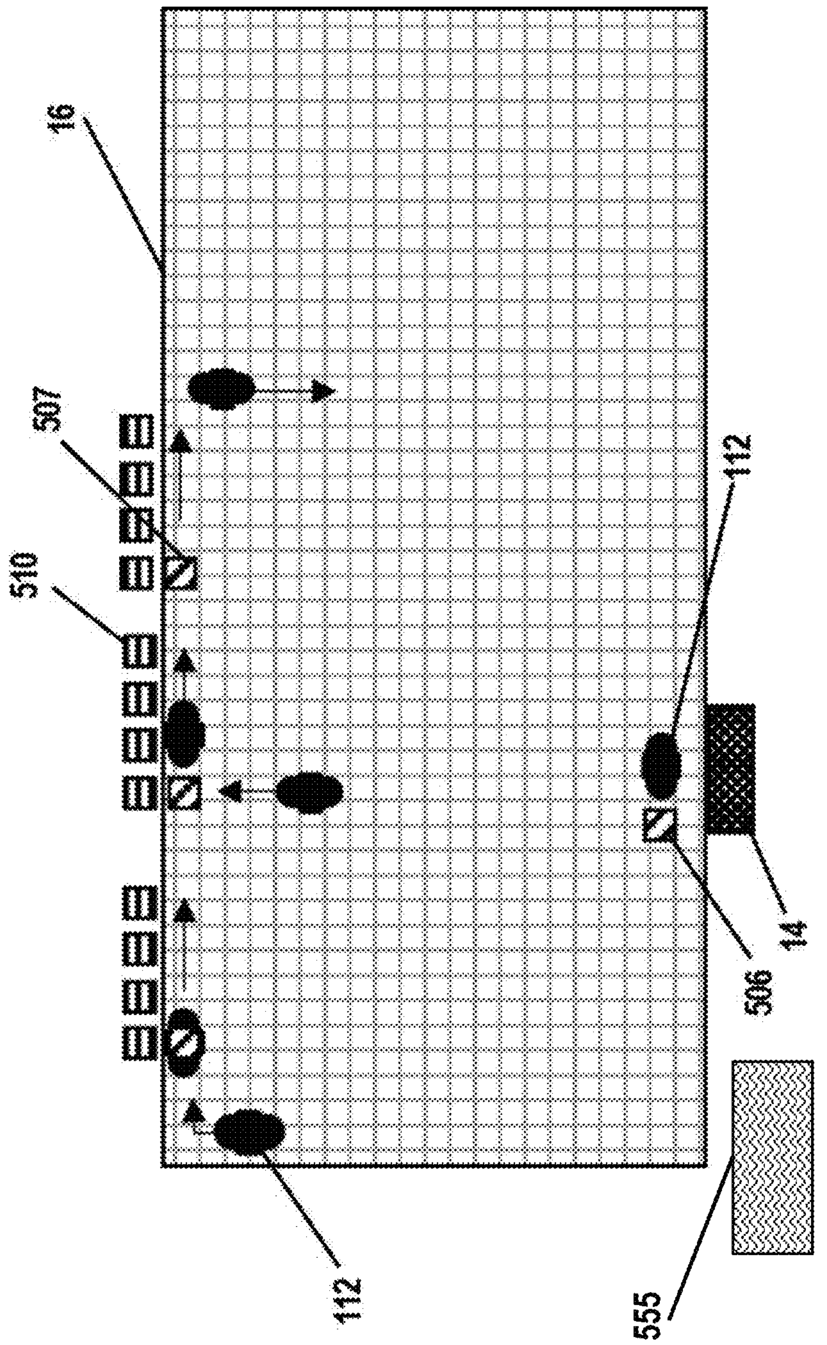
FIG. 6 illustrates a different top schematic view of a portion of the first function platform of FIG. 2, according to at least one embodiment of the presently disclosed subject matter.

As illustrated in FIG. 5, in some embodiments, each first sort receptacle 510 is in a one-to-one correspondence with a respective second information acquisition device 507, In at least one embodiment, a bank of first sort receptacles 510 (e.g., in the form of prescription drug container receptacles) are serviced by an optional single second information acquisition device 507, as shown, for example, in FIG. 6. As shown in FIG. 5 and FIG. 6, at least one first information acquisition device 506 is provided at or about a first function article induction station 14 where the first function articles 20 (for e.g., in the form of prescription drug containers 20*a*) to be sorted to first sort receptacles 510 are inducted. First information acquisition device 506 is configured to acquire article information of each first function article 20 to be sorted as it is inducted at first function article induction station 14. In some embodiments, a plurality of first function article induction stations 14 are provided. Each first function article induction station 14 is provided with at least one first information acquisition device 506, such that the tasks of article information acquisition and sorting of the plurality of first function articles 20 (for e.g., in the form of prescription drug containers 20*a*) may be performed simultaneously at the plurality of first function article induction stations 14 to significantly increase the article information acquisition efficiency, thereby improving the sorting efficiency of first function articles 20 (for e.g., in the form of prescription drug containers 20*a*).

Figure 7:
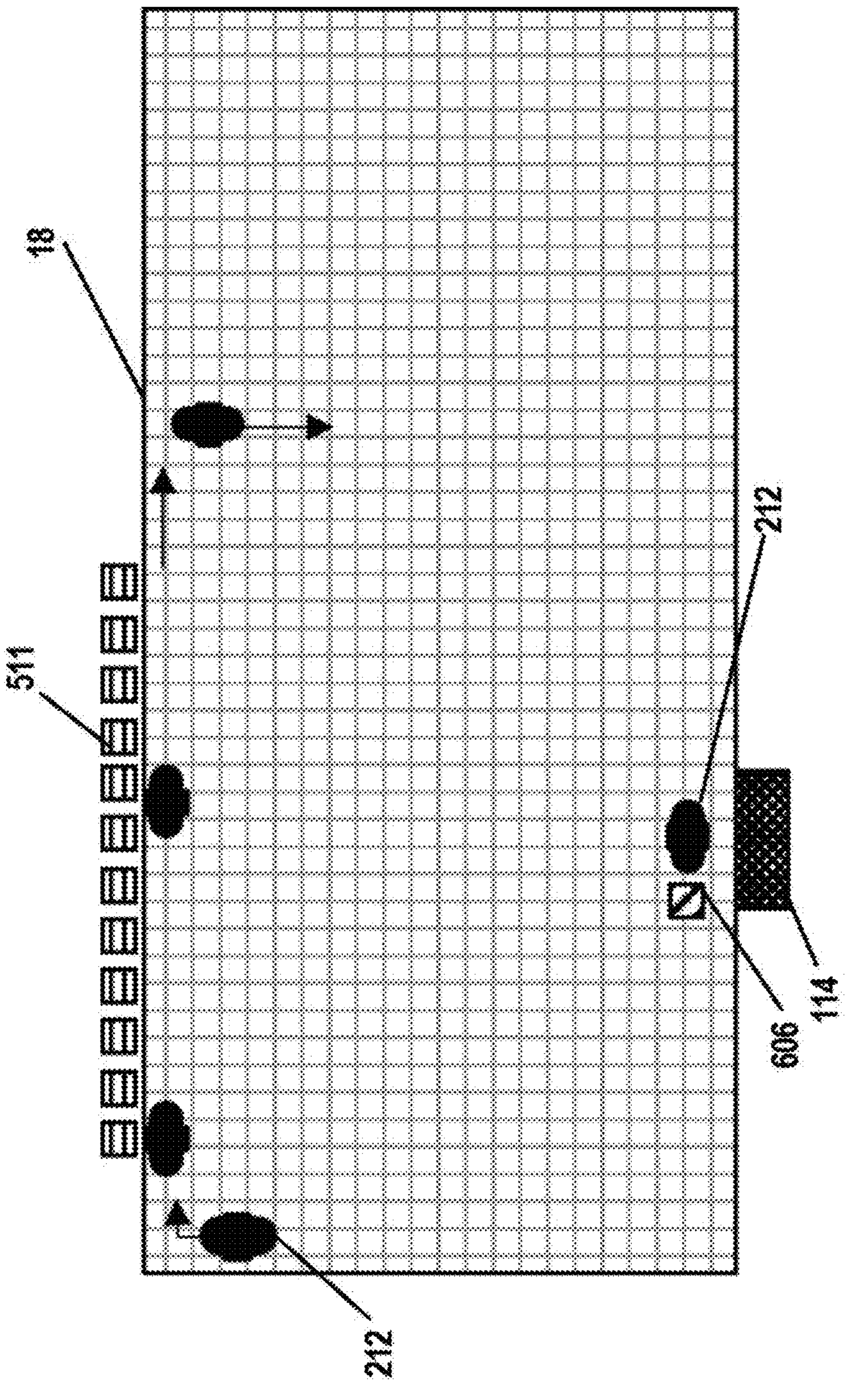
FIG. 7 illustrates a top schematic view of a portion of the second function platform of FIG. 2, according to at least one embodiment of the presently disclosed subject matter.

In at least one embodiment, as illustrated in FIG. 7, system 500 further includes one or more second function article induction stations 114 where a second function article information acquisition device 606 captures article information or package information provided on label 26 present on second function article 24. In various embodiments, second function article information acquisition device 606 may have same or similar features as first information acquisition device 506 or second information acquisition device 507. In one embodiment, server 502 receives the article or package information from label 26 on a second function article 24 as captured by second function article information acquisition device 606 and uses this article or package information to determine and assign a specific second sort receptacle 511, among a plurality of second sort receptacles 511 (see FIG. 7), for second function vehicle 212 to transport the given second function articles 24 for deposition thereto. In various embodiments, each of the plurality of second sort receptacles 511 can be associated with a customer, a physical address, a physical hub, a zip code, a locality, a store, a commercial establishment, a home address, a geographical sub-area, a county, a town, a city, a superstore, a departmental store, a retail store, an apartment building complex, an office park, a university, a college, a drug store, a local pharmacy, a hospital, a healthcare center, or a similar other location. System 500 accordingly comprises a plurality of second function vehicles 212 traversing second function platform 18, wherein server 502 is configured to assign a second sort receptacle 511 among a plurality of second sort receptacles 511 (see FIG. 7) for the second function vehicle 212 to transport a second function articles 24 for deposition into the assigned second sort receptacle 511. According to one embodiment, the second function vehicle 212 is larger than the first function vehicle 112; in one embodiment, the second function vehicle 212 has a greater carrying capacity than the first function vehicle 112.

Each of first information acquisition device 506 and second information acquisition device 507 may comprise a scanning device, e.g., a RFID reader, capable of detecting and acquiring an information (e.g., in form of a bar-code) present on a tag such as tag 22 coupled to a first function article 20. In one embodiment, tag 22 comprises a RFID (Radio-frequency Identification) associated with the first function article 20. In one embodiment, each of first information acquisition device 506 and second information acquisition device 507 includes a barcode reading device, a CCD (charged-coupled device) camera, or a similar other device. In various embodiments, each of first information acquisition device 506 and second information acquisition device 507 is configured to capture a numerical count and other parameters of the specific units of a material, e.g., pills, contained in each first function article 20 as well as the production lot number and expiry date of the material contained in the first function article 20. Thus, it is possible to detect and double-check whether the first function article 20 actually contains the actual units of material (with respect to both the parameters and the number of units of the material) to which the first function article 20 corresponds. Also, it is possible to detect and double-check whether the first function article 20 contains materials belonging to a lot that has been recalled or otherwise is blocked from getting distributed. And, additionally, it may be detected and double-checked that the actual date of distribution is well before the expiration date of the material so that there is a sufficient period left before the expiration date. These data can be archived so that in the extremely rare case of a recall these data can be retrieved from a database. Such features may be advantageous with medical prescriptions and other medicines being sorted for delivery.

In the above, there are many manners for the first information acquisition device 506 to acquire the article information of first function article 20 to be sorted. In one embodiment, the information on the first sort receptacle 510 into which a given first function article 20 is to be sorted into is carried in a receptacle address information code, the receptacle address information code being provided on the first function article 20 to be sorted. In various embodiments, tag 22 carries article information that may include information regarding the specific first sort receptacle 510 into which a given first function article 20 is to be sorted. In one embodiment, each of the first information acquisition device 506 and the second information acquisition device 507 includes a scanner. The scanner is configured to scan the tag 22 for determining the first sort receptacle 510 of the first function article 20 to be sorted. For example, the first function article 20 to be sorted (or on the tag 22 coupled to first function article 20) is provided thereon with receptacle address information codes containing information pertaining to the receptacle 510 into which the respective first function article 20 is to be sorted into; the first information acquisition device 506 obtains the information pertaining to the respective first sort receptacle 510 into which a given first function article 20 is to be sorted by scanning the receptacle address information codes on the first function article 20 (or on the tag 22 coupled to first function article 20) to be sorted. The receptacle address information code may be a bar code, a two-dimensional code, a radio frequency tag, or a similar other item, and correspondingly, the first information acquisition device 506 and second information acquisition device 507 may be or may include a bar code scanner, a two-dimensional code scanner, a radio frequency identifier, etc. According to actual demands, in addition to the first sort receptacle 510, the article information may further contain information about the drug container's volume, weight etc., and correspondingly, the first information acquisition device 506 and second information acquisition device 507 may further include a weighing device, a volume scanner, etc.

While the article information is highly-efficiently obtained, in order to improve the efficiency of subsequent sorting, in one embodiment, after first information acquisition device 506 acquires the article information of the respective article to be sorted, system 500 or server 502 completes an analytical processing of the obtained article information of all the articles to be sorted. System 500 is in communication with all the first information acquisition devices 506 and all second information acquisition device 507 so as to obtain the article information acquired by all of the first information acquisition devices 506 and all of the second information acquisition devices 507 and to further obtain information pertaining to all the article receptacles or order receptacles assigned to receive the respective article to be sorted. In various embodiments, second information acquisition devices 507 may have identical or similar features and qualities as first information acquisition device 506.

In various embodiments, the first function article 20 in the form of prescription drug container 20*a* (see FIG. 8B) contains a medication (in solid, liquid or vapor form or combinations thereof) that is based on a prescription order (alternately referred to as "order") received from a customer (i.e., a customer prescription medication order or request). In one embodiment, system 500 is configured for acquiring, by first information acquisition device 506 of a first function article information from tag 22*a* coupled to an article such as prescription drug container 20*a*. System 500 or server 502 is accordingly configured to receive the first function article information acquired by the first information acquisition device 506. Server 502 is further configured to determine a first sort receptacle 510, among a plurality of first sort receptacles 510, for the first function vehicle 112 to transport and deposit the prescription drug container 20*a* thereto based on the first function article information received from the first information acquisition device 506. After receiving the prescription drug container 20*a* that is loaded or inducted thereto by a human or a robotic arm, the first function vehicle 112 starts traveling towards the first sort receptacle 510 assigned by system 500 or server 502 for that specific prescription drug container 20*a*. In one embodiment, prior to the first function vehicle 112 depositing the prescription drug container 20*a* into its assigned first sort receptacles 510, second information acquisition device 507 acquires a second function article information from the tag 22*a* coupled to the prescription drug container 20*a*. Server 502 is further configured to receive the second function article information acquired by the second information acquisition device 507. In one embodiment, sortation engine 508 *o* is configured to compare the first function article information against the second function article information. Server 502 is further configured to direct the first function vehicle 112 to deposit the prescription drug container 20*a* into the assigned first sort receptacles 510 further to and based on the comparison. In some cases, system 500 or server 502 or sortation engine 508 requires a 100% match during the comparison step; in other cases, system 500 or server 502 or sortation engine 508 requires a less than 100% match (e.g., 80% match, 90% match, 99% match, etc.) during the comparison step. In various embodiments, the second information acquisition device 507 is positioned proximal to the first sort receptacle(s) 510. In at least one embodiment, when there the match during the comparison step is found to be less than 100% (e.g., less than 99%, less than 90%, less than 80%, etc.), system 500 may generate an alert for intervention whereby a human operator or a robotic supervisions system, for e.g., an AI exception analytics system, receives a prompt to investigate the reason for the lack of expected match threshold, and take any corrective action needed to prevent its re-occurrence.

According to at least one embodiment, after first function vehicle 112 has attempted to deposit a prescription drug container 20*a* into the prescription receptacle, system 500 is further configured to direct scanning of a top region of the first function vehicle 112 to confirm that the prescription drug container 20*a* has been deposited into the first sort receptacle 510. For example, after a first function vehicle 112 attempts to divert or deposit a prescription drug container 20*a* carried thereon into a first sort receptacle 510, the first function vehicle 112 is directed by system 500 or server

502 to pass underneath (or proximal) a third information acquisition device, wherein the third information acquisition device has properties similar to the first information acquisition device 506 or by the second information acquisition device 507. The third information acquisition device operates to scan a top region of the first function vehicle 112 to confirm that there is no prescription drug container 20*a* present thereon; in other words, third information acquisition device, in conjunction with server 502 or system 500, operates to confirm that the prescription drug container 20*a* has positively been deposited into the assigned first sort receptacle 510. In one embodiment, the third information acquisition device may take the form of an object detection device (camera, lidar sensor, ultrasonic sensor, scale, etc.) that is configured to determine whether something is on the first function vehicle 112; in at least one embodiment, the third information acquisition device is configured to determine whether any unintended material or package is left on second function vehicle 212 after the first function vehicle 112 has attempted to deposit its payload into an assigned first sort receptacle 510. Accordingly, when the scan indicates that the prescription drug container 20*a* is still present on or about the first function vehicle 112, system 500 may generate an alert for intervention whereby a human operator or an AI system receives a prompt to investigate the reason why the divert was unsuccessful, and take any corrective action needed to prevent its re-occurrence.

According to at least one embodiment, system 500 is further configured for receiving, at the server, of the first function article information acquired by the first information acquisition device 506 before the prescription drug container 20*a* is loaded onto the first function vehicle 112. According to at least one embodiment, system 500 is further configured for receiving, at the server, of the first function article information acquired by the first information acquisition device 506 after the prescription drug container 20*a* is loaded onto the first function vehicle 112. According to at least one embodiment, system 500 is further configured for comparing the first function article information against the second function article information prior to the prescription drug container 20*a* being deposited into the first sort receptacle 510. This step may advantageously reduce or eliminate any errors in fulfilling article orders such as prescription orders. This step results in improved accuracy particularly in automated fulfilling of prescription medications. In at least one embodiment, system 500 or server 502 is configured to subject the first function vehicle 112 carrying the prescription drug container 20*a* into a resolution routine when a discrepancy is identified during the comparing step. For example, in a case where the comparison of the first prescription information against the second prescription information indicates that there is a discrepancy (e.g., less than 100% match, less than 95% match, less than 90% match, less than 80% match, etc.), system 500 operates to generate an alert for a manual intervention or AI system intervention whereby a human operator or a robotic system may receive a prompt to investigate the reason for the discrepancy, and take any corrective action needed to prevent its re-occurrence. This "double-checking" feature can advantageously reduce or prevent the chance of a prescription being mailed to the wrong person or wrong address. In various embodiments, server 502 is further configured to associate an order (e.g., a customer's order for prescription medication) with each first sort receptacle 510. In various embodiments, the order comprises a plurality of prescription drug containers 20*a*. In at least one embodiment, the order comprises a single prescription drug container 20*a*. In various embodiments, server 502 is further configured for directing removal of the receptacle after completion of the order (i.e., after all prescription drug containers 20*a* associated with that order have been deposited in the assigned first sort receptacle 510). In various embodiments, server 502 is further configured to direct removal of the first sort receptacle 510 after completion of the order, and optionally further direct replacement with an empty first sort receptacle 510. In various embodiments, server 502 is also configured to direct affixing of label 26 carrying an address information on or about second function articles 24.

In various embodiments, the second function platform 18 is elevated as compared to first function platform 16. In some embodiments, second function platform 18 is positioned above, and occupies the same or similar footprint as first function platform 16. In at least one embodiment, the first information acquisition device 506 and second information acquisition device 507 are fixed in position. In at least one embodiment, the first information acquisition device 506 and second information acquisition device 507 are not fixed in position. In at least one embodiment, one or more of the first information acquisition device 506 and second information acquisition device 507 are handheld. In at least one embodiment, the second information acquisition device 507 is shared by the plurality of first sort receptacles 510 as shown, for e.g., in FIG. 6. In at least one embodiment, a single second information acquisition device 507 is dedicated to (i.e., paired with) a single first sort receptacle 510 as shown, for e.g., in FIG. 5. In some embodiments, server 502 may comprise two servers wherein a first server (referred to as "first function sorting server") is configured to perform the first sorting tasks and a second server (referred to as "second function sorting server" is configured to perform second sorting tasks; both the first function sorting server and the second function sorting server may otherwise comprise all features, and perform all functions as, server 502 as described herein.

In various embodiments, first function vehicles 112 in the form of small, automated vehicles travel on a lower platform such as first function platform 16 to consolidate first function articles in the form of individual prescriptions into their respective orders. The first function vehicles 112 divert first function article 20 into first sort receptacles 510 along the edge of first function platform 16 (e.g., a lower level). Packing stations such as packing stations 555 shown in FIG. 16 may be positioned near to first sort receptacles 510. When a first sort receptacle 510 has received all of the individual first function articles 20 that comprise a specific order, the first sort receptacle 510 is removed from its position along the first function platform 16 and replaced with an empty first sort receptacle 510 so that a different new order can be sorted to the location of the replaced empty first sort receptacle 510. In one embodiment, all of the first function articles 20 in the first sort receptacle 510 comprising a completed order are packed, at the nearby packing station 555, into a bag, package, or box such as second function articles 24 and a label such as label 26 that includes destination information (e.g., in the form of shipping information) is coupled to each second function article 24. Second function article 24 in the form of a package containing all first function articles 20 associated with a completed order is inducted onto second function vehicle 212 on second function platform 18, wherein the second function platform 18 is positioned as an upper-level platform as compared to first function platform 16. In at least one embodiment, second function vehicle 212 is larger than first function vehicles 112. In some embodiments, second function vehicle 212 are the same size as first function vehicles 112.

In one embodiment, at second function article induction station 114, second function article information acquisition device 606 may capture destination information (e.g., in the form of shipping information) contained on label 26 coupled to second function articles 24, for e.g., in the form of packages, and second function articles 24 may then be inducted onto a second function vehicle 212 at second function article induction stations 114. System 500 receives the destination information contained on label 26 (that was captured by second function article information acquisition device 606) and assigns a second sort receptacle 511, among a plurality of second sort receptacles 511, for second function vehicle 212 carrying the just inducted second function articles 24 to deposit second function articles 24 thereto. Second function vehicle 212 carrying the just inducted second function articles 24 may travel along second function platform 18 to a position proximate to the assigned second sort receptacle 511, as assigned by system 500 or by server 502, and the second function articles 24 is diverted for deposition into the assigned second sort receptacle 511. In one example, the assigned second sort receptacle 511 is associated with the store, pharmacy, or a customer address to which a second function article 24 in the form of, for e.g., a package, is ultimately to be delivered.

In various embodiments, at an automatic or manual pack station, first function articles 20 are packed into a second function articles 24 in the form of bag, package, or box, each second function articles 24 including all first function articles 20 associated with a single customer. A shipping label such as label 26 is then applied to the second function articles 24. The shipping label may carry the address of a store or local pharmacy associated with a customer or customer order; the shipping label may alternately just carry information regarding the customer order along with information on the store or local pharmacy at which the customer is expected to pick up the second function articles 24. In at least one embodiment, shipping label may only carry a store or local pharmacy address and an order number, which the system or server can utilize to associate with the customer information whereby no customer information is provided on the second function articles 24. In one embodiment, the shipping label may carry the address of a customer, or an address associated with a customer order. The second function articles 24 is then scanned and placed on a second function vehicle 212 operating on second function platform 18. Second function vehicle 212 carries second function articles 24 proximate to a second sort receptacle 511 assigned by system 500 or by server 502, and the second function articles 24 is diverted and deposited into the assigned second sort receptacle 511.

In one embodiment, a plurality of second function articles 24 may be deposited into a single assigned second sort receptacle 511 wherein the single assigned second sort receptacle 511 may correspond to the orders to be delivered to a local pharmacy located at, for e.g., a certain zip code. In such a case, after system 500 or server 502 determines that all packages destined for the specific local pharmacy address have been deposited into an assigned second sort receptacle 511, system 500 or server 502 may alert that the assigned second sort receptacle 511 or the contents thereof are ready for shipping out to the location of the local pharmacy.

Figure 12:
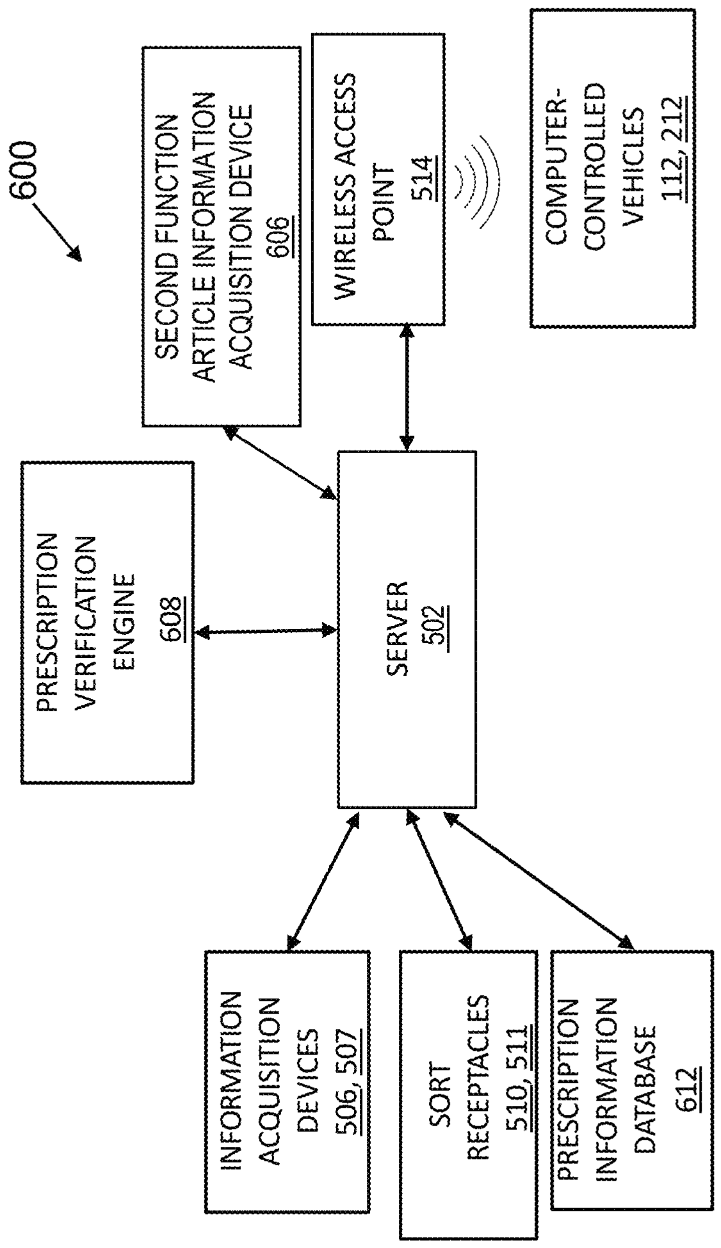
FIG. 12 illustrates a block diagram of an exemplary sorting verification system 600 for use in directing and verifying sorting operations in a centralized or localized sorting facility, according to at least one embodiment of the presently disclosed subject matter.

Embodiments disclosed herein may further provide for verification of prescription drug containers being sorted, and in at least one embodiment, sorting verification system 600 illustrated in FIG. 12 provides for or assists with such verification services. Drug prescriptions may be filled into prescription drug container **20*a* in the form of vials or cartons such as, for e.g., containing the prescription may have an RFID tag attached thereto. The RFID tag operates to uniquely identify each prescription drug container 20*a* and thereby RFID tag operates to uniquely identify each prescription. First function vehicle 112 operating on first function platform 16, for e.g., on the lower level may be required by system 500 or sorting verification system 600 to pass under one or more RFID readers at key locations to confirm that a specific first function vehicle 112 is in fact carrying the correct or proper prescription or that it is devoid of any prescription. In embodiment, these RFID readers may form part of the first information acquisition device 506 or second information acquisition device 507**.

In one example, after exiting the induction location, the specific first function vehicle 112 is routed to pass under first information acquisition device 506 (for e.g., including an RFID reader) that captures the prescription information in the form of first function article information from tag **22*a* of prescription drug container 20*a*. The first function article information (i.e., the prescription information captured by first information acquisition device 506) is received at server 502, and either server 502 or sortation engine 508 compares the first function article information with the expected article information. If and when server 502 or sortation engine 508 or prescription verification engine 608 concludes that there is a match between the captured value and the expected value, server 502 directs first function vehicle 112 to continue along to carry out its sorting assignment. If the comparison indicates an issue (e.g., due less than 100% match, less than 99% match, less than 90% match less than 85% match), server 502 directs first function vehicle 112 to transport the "at-issue" prescription drug container 20*a*** to a predetermined reject location for resolution.

In at least one embodiment, right before first function vehicle 112 arrives at or near a designated first sort receptacle 510 into which the first function article 20 is to be sorted into, first function vehicle 112 is routed to pass under second information acquisition device 507 (for e.g., including an RFID reader) that captures the article information from tag 22 of first function article 20. Either server 502 or sortation engine 508 or prescription verification engine 608 compares the first function article information against the second function article information. Server 502 is further configured to direct the first function vehicle 112 to deposit the first function article 20 into the designated first sort receptacle 510 when the comparison yields a satisfactory result (e.g., 100% match, 99% match, at least 80% match, etc.).

In one embodiment, after the first function vehicle 112 diverts or deposits the first function article 20 into the designated first sort receptacle 510, a further acquisition device (for e.g., including an RFID reader) operates to detect whether any article, tag, prescription drug container, package, or other unexpected object (or material) is present on or about first function vehicle 112. If no such object is detected, system 500 or sorting verification system 600 directs the first function vehicle 112 to proceed to perform its next assigned task. If an article, tag, prescription drug container, package, or other unexpected object is detected, system 500 or sorting verification system 600 operates to: either send the first function vehicle 112 to a predetermined resolution location to resolve the issue or direct the first function vehicle 112 to remain at its location until a human operator arrives to the location to resolve the issue. In one embodiment, it is preferable to have the first function vehicle 112 remain at its location because the problem may arise from the article (e.g., in the form of a prescription drug container) simply failing to deposit and may merely require an operator to push or transfer the article into the designated first sort receptacle 510 at or near that location where the first function vehicle 112 was directed by system 500 or sorting verification system 600 to stay put.

In one embodiment, when first function vehicle 112 approaches a bank of first sort receptacle 510, it passes under the adjacent second information acquisition device 507 (for e.g., including an RFID reader) before going to a specified first sort receptacle 510 within that bank. This approach of one information acquisition device being shared among several receptacle locations results in lower cost as compared to having one information acquisition device provided for each first sort receptacle 510. After a comparison between the first function article information and the second function article information indicates that there is adequate match between these values, server 502 directs first function vehicle 112 to continue along its route to deposit the first function article 20 into the designated first sort receptacle 510. If the comparison indicates an issue (e.g., due to lack of 100% match), server 502 directs first function vehicle 112 to transport the "at-issue" first function article 20 to a predetermined reject location or resolution location for resolution. In some embodiments, the same comparison set up and protocols may be applied prior to the deposition of second function articles 24 into second sort receptacles 511.

Figure 8A:
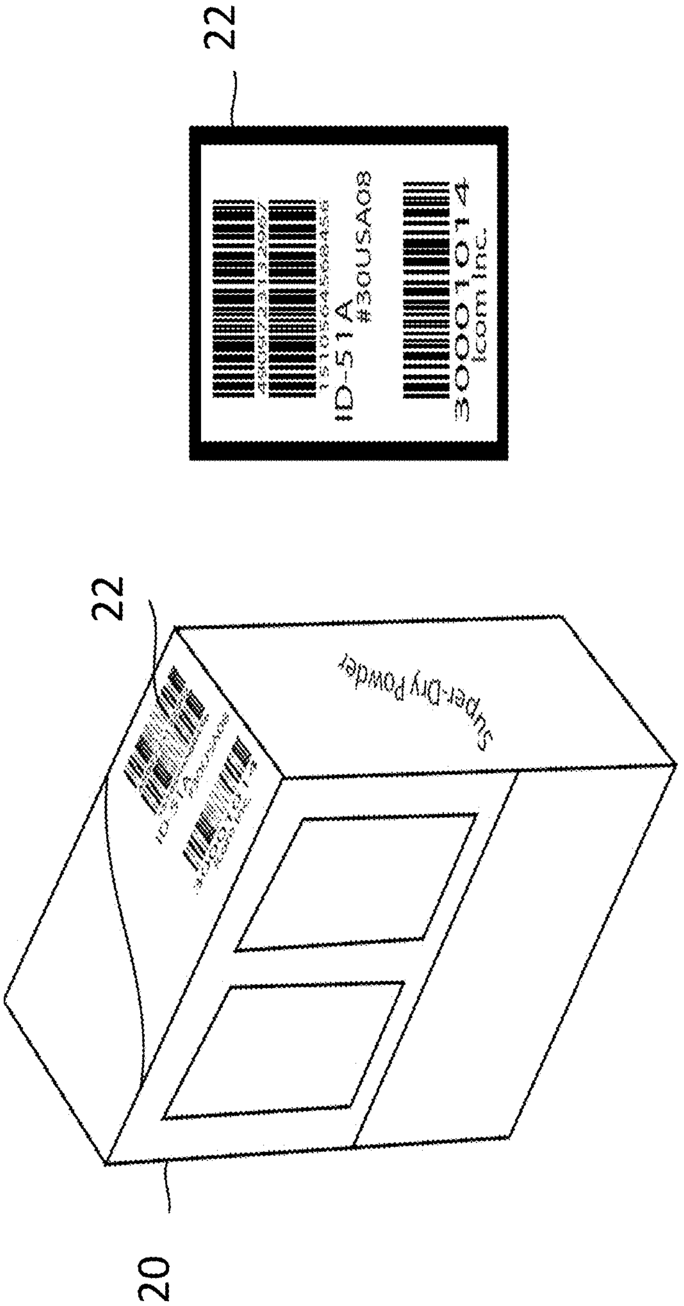
FIG. 8A illustrates a perspective view of a first function article with a tag coupled thereto and a front schematic view of the tag, according to at least one embodiment of the presently disclosed subject matter.
Figure 8B:
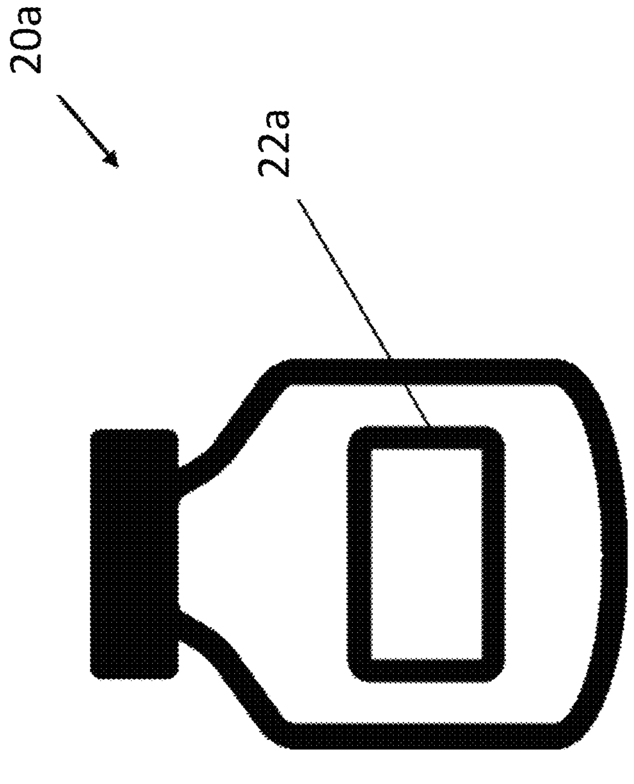
FIG. 8B illustrates a front schematic view of a first function article in the form of a prescription medication vial with a tag coupled thereto, according to at least one embodiment of the presently disclosed subject matter.

FIG. 8A illustrates first function article 20 with an identifier such as tag 22. Referring to FIG. 8A, at an induction station, the second information acquisition device 507 interacts with a tag 22 present on a first function article 20. As shown in FIG. 8A, tag 22 may include a UPC (Universal Product Number) code; alternately, tag 22 may include a similar other unique identification code. Second information acquisition device 507 may be positioned proximal first function platform 16. In one embodiment, second information acquisition device 507 is a UPC scanner; in an alternate embodiment, second information acquisition device 507 may be carried by, and operated by, a person, i.e., second information acquisition device 507 may not be fixedly positioned. In a further embodiment, vehicle may include a scannable code such that when a first function article 20 is placed on the vehicle, second information acquisition device 507 scans both the UPC on the first function article 20 and the scannable code on the vehicle to determine which article is associated with which vehicle. Alternatively, the vehicle may include an information acquisition device mounted thereon for imaging the tag 22 present on first function article 20. All of these identification devices may be RFID tags, other types of bar codes, or any other type of item and vehicle recognition methods.

In one embodiment, the vehicle carrying thereon a first function article 20 associated with, for e.g., the retail order (an exemplary embodiment of a first function article 20 is illustrated in FIG. 8A) may be directed by server 502 to deposit the first function article 20 into the specific first sort receptacle 510 associated with a specific marker based on the location of the specific marker. Thus, in operation, once system 500 or sorting verification system 600 determines that a first sort receptacle 510 needs a first function article 20 deposited therein, server 502 of system 500 or sorting verification system 600 causes the vehicle to traverse first function platform 16 to first sort receptacle 510 and to deposit the first function article 20 by manipulation of the vehicle from a first position where the first function article 20 is firmly located on the vehicle to a second position where the article commences sliding towards first sort receptacle 510 for depositing the selected first function article 20 in first sort receptacle 510.

In one embodiment, first function article 20 takes the form of prescription drug container 20*a*, and tag 22 takes the form of tag 22*a* coupled to a prescription drug container 20*a*. In various embodiments, each of first information acquisition device 506 and second information acquisition device 507 is configured to capture the numerical count and other parameters of the specific medicament contained in each prescription drug container 20*a* as well as the production lot number and expiry date of the medicament contained in the prescription drug container 20*a*. Thus, it is possible to detect and double-check whether the prescription drug container 20*a* actually contains the medicament belonging to a particular customer order (with respect to both the parameters and the number of units of the medicament) to which the prescription drug container 20*a* corresponds. Also, it is possible to detect and double-check whether the prescription drug container 20*a* contains medicament belonging to a lot that has been blocked from being distributed. And, additionally, it may be detected and double-checked that the actual date of distribution is well before the expiration date of the medicament so that there is a sufficient period left before the expiration date. These data can be archived so that in the extremely rare case of a recall these data can be retrieved from a database.

System 500 comprises a server 502 comprising, among others, a sortation engine 508 that additionally operates as a prescription verification engine. In some implementations, sortation engine 508 may reside external to server 502 but nonetheless in communication with server 502. System 500 further comprises or is in communication with article information database 512, one or more first sort receptacles 510, one or more second sort receptacles 511, one or more first information acquisition devices 506 (e.g., a scanner, an image capturing equipment, and similar other equipment), and one or more second information acquisition devices 507 (e.g., a scanner, an image capturing equipment, and similar other equipment). System 500 includes additional components such as a wireless access point 514, first function platform 16, second function platform 18, among others. System 500 further comprises first function platform 16, second function platform 18, and sort shelf bank 32. System 500 may further comprise packing stations 555, labeling stations, shipping stations, loading docks and similar other components as found in typical centralized warehouse sorting systems as a person of skill in the art would readily understand, such components not shown or described herein for the sake of brevity.

Figure 10A:
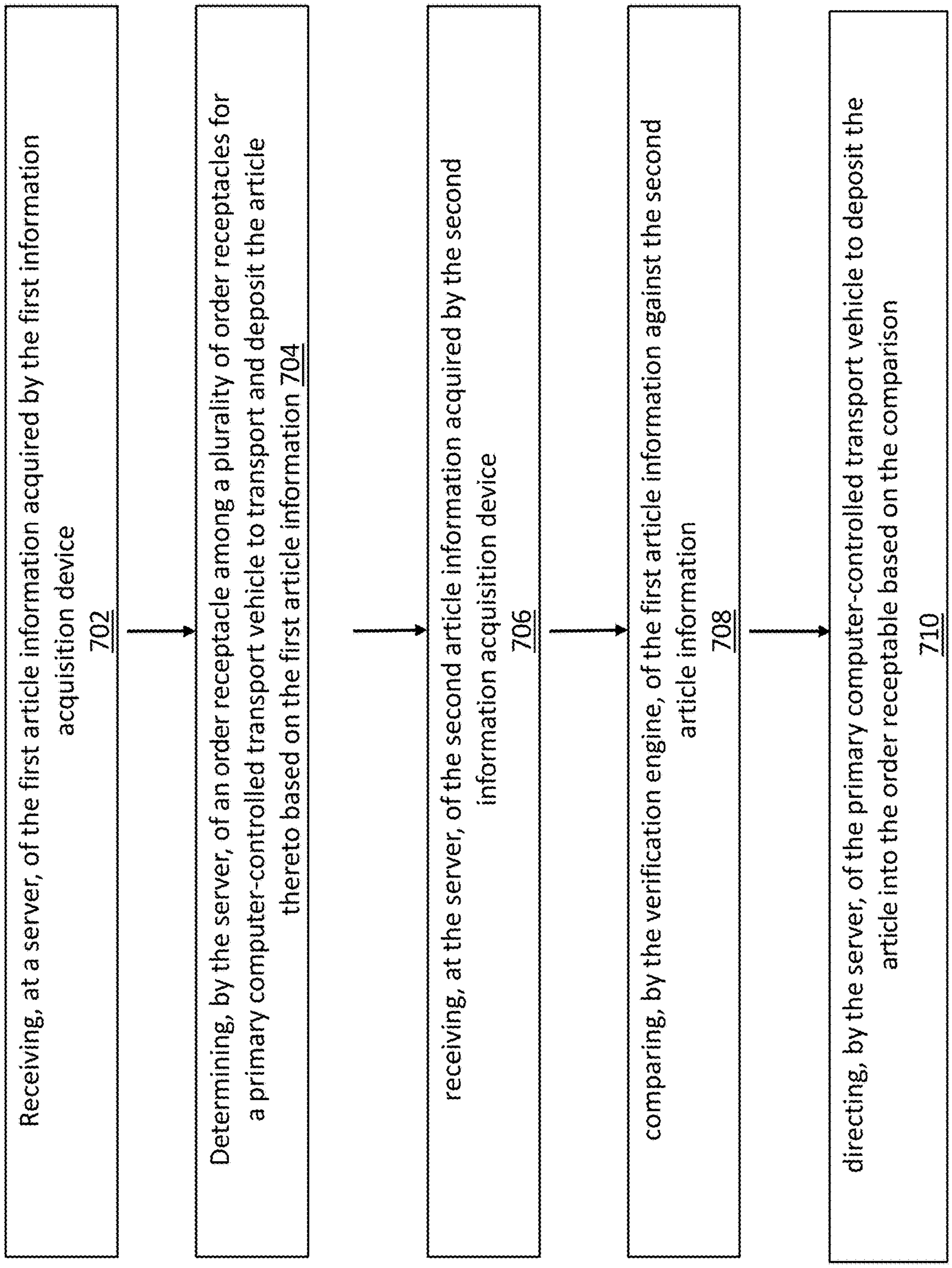
FIG. 10A depicts a flowchart of an exemplary implementation of an improved system for use in directing article sorting, for e.g., in a centralized or localized multi-function sorter system sorting operation, according to one or more implementations of the presently disclosed subject matter.

According to various embodiments of the presently disclosed subject matter, as shown in FIG. 10A, a method of directing a medication sorting operation comprises acquiring, by a first information acquisition device, of a first function article information from a tag coupled to an article. The method further comprises receiving, at a server, of the first function article information acquired by the first information acquisition device (702). The method further includes determining, by the server, of an order receptacle among a plurality of order receptacles for a first function vehicle to transport and deposit the article thereto based on the first function article information (704). The method also comprises acquiring, by a second information acquisition device, of a second function article information from the tag coupled to the article prior to the deposition of the article into a receptacle. The method further comprises receiving, at the server, of the second function article information acquired by the second information acquisition device (706). The method furthermore comprises comparing, by the sortation engine, of the first function article information against the second function article information (708). The method also comprises directing, by the server, of the first function vehicle to deposit the article into a specific receptacle associated with a specific order as determined by the server based on the comparison (710).

Figure 10B:
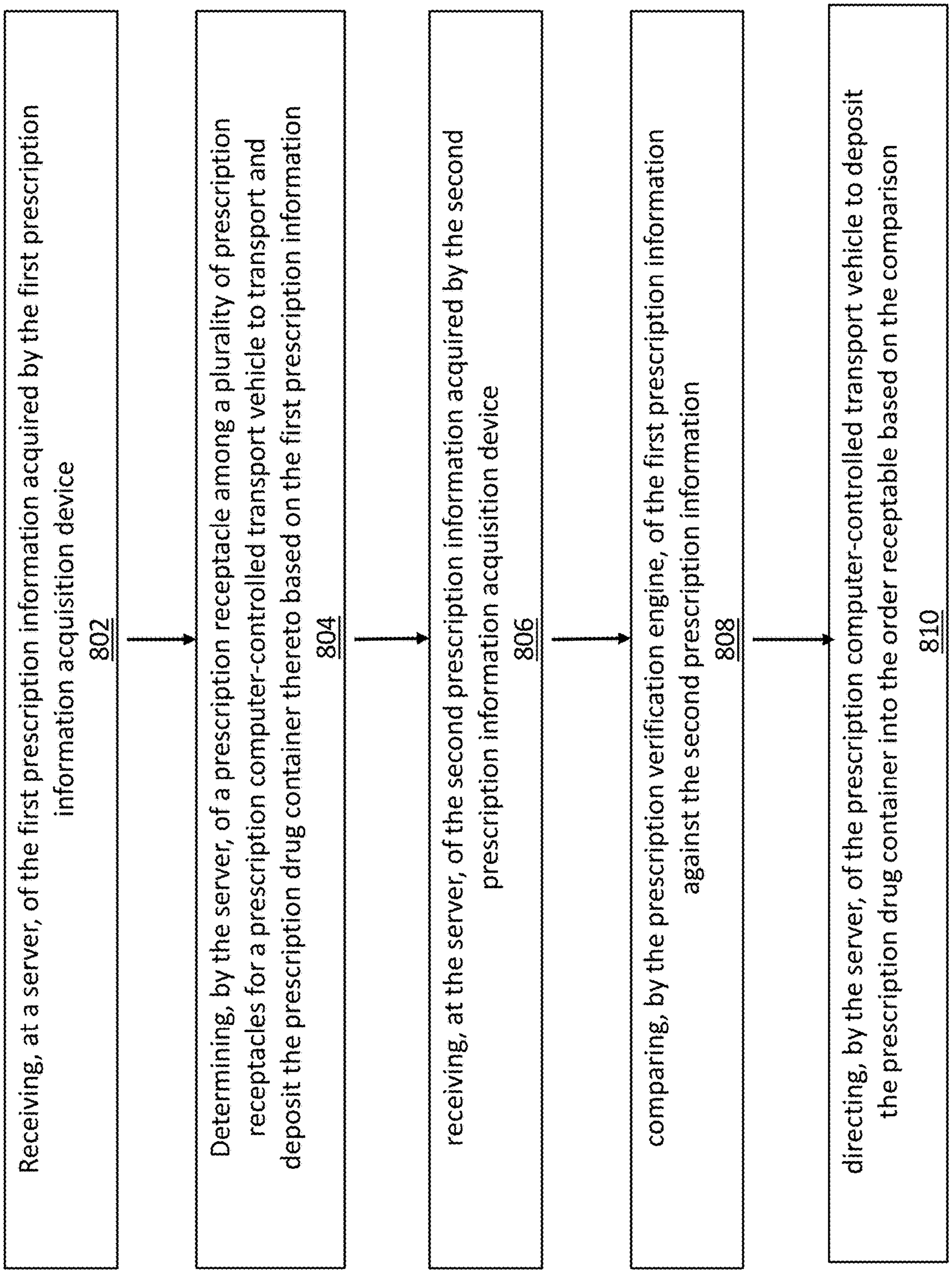
FIG. 10B depicts a flowchart of an exemplary implementation of an improved system for use in directing medication sorting, for e.g., in a centralized or localized multi-function sorter system sorting operation, according to one or more implementations of the presently disclosed subject matter.
Figure 11B:
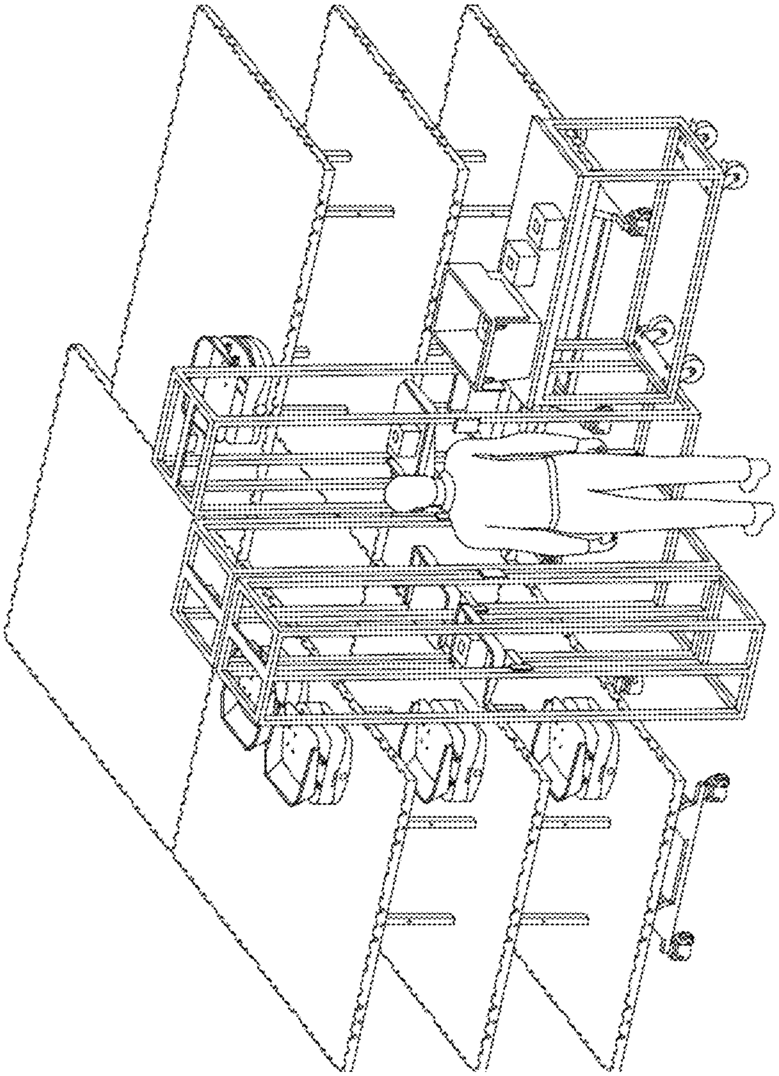
FIGS. 11A and 11B depict perspective views of a lift (alternately referred to herein as “induction lift”) setups, according to one or more implementations of the presently disclosed subject matter.
Figure 11A:
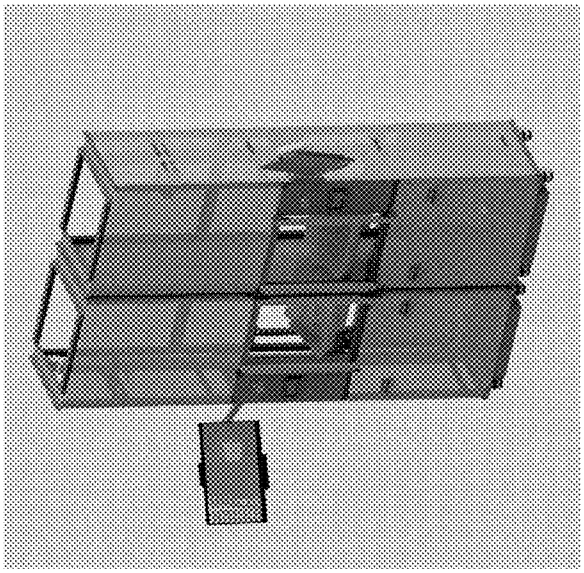

According to various embodiments of the presently disclosed subject matter, as shown in FIG. 10B, a method of directing a medication sorting operation comprises acquiring, by a first information acquisition device, of a first prescription information from a tag coupled to a prescription drug container. The method further comprises receiving, at a server, of the first prescription information acquired by the first information acquisition device (Step 802). The method further includes determining, by the server, of a receptacle among a plurality of prescription receptacles for a first function vehicle to transport and deposit the prescription drug container thereto based on the first prescription information (Step 804). The method also comprises acquiring, by a second information acquisition device, of a second prescription information from the tag coupled to the prescription drug container prior to the deposition of the article into a receptacle. The method further comprises receiving, at the server, of the second prescription information acquired by the second information acquisition device (Step 806). The method furthermore comprises comparing, by the sortation engine operating as a prescription verification engine, of the first prescription information against the second prescription information (Step 808). The method also comprises directing, by the server, of the first function vehicle to deposit the prescription drug container into a specific receptacle (e.g., in the form of a prescription receptacle) associated with a specific order as determined by the server based on the comparison (Step 810).

In at least one embodiment, an output of the first function sorting system 503 and an output of the second function sorting system 504 are combined and provided as an input to a third function sorting system. The third function sorting system may be positioned above or below the first function sorting system or the second function sorting system 504. In at least one embodiment, the third function sorting system is positioned adjacent to the first function sorting system or adjacent the second function sorting system 504. In at least one embodiment, the third function sorting system is configured for parcel sortation.

In one embodiment, the multi-function sorting system ("system") includes three or more levels, all for sorting to a put wall; accordingly, one embodiment includes 3 or more levels of unit sortation. In one embodiment, one or more put walls are provided near the system, the put walls provided with various size locations, bins, or receptacles for orders of different sizes. Items for larger orders may sort on the lower level to larger bins and higher levels sort smaller orders into smaller bins. The system may possess cubic data for each item and the system is configured to calculate the volume of each order.

According to various embodiments, a sorting verification system such as sorting verification system 600 as shown in FIG. 12 is provided. Sorting verification system 600 may operate either separate from or in conjunction with a multi-function sorter system such as system 500. In various embodiments, as shown, for example, in FIG. 12, sorting verification system 600 may further have the same components as, or share one or more components with, system 500. According to at least one embodiment, as shown in FIG. 12, sorting verification system 600 comprises, among others, server 502, first function vehicles 112, second function vehicles 212, wireless access point 514, prescription verification engine 608, one or more first information acquisition devices 506, one or more second information acquisition devices 507, one or more first sort receptacles 510, one or more second sort receptacles 511, second function article information acquisition device 606, and prescription information database 612. In various embodiments, server 502, first function vehicles 112, second function vehicles 212, wireless access point 514, first information acquisition devices 506, second information acquisition devices 507, first sort receptacles 510, and second sort receptacles 511 of sorting verification system 600 may be identical to similarly numbered components forming part of system 500, i.e., components of system 500 having the same name or element number notation.

In at least one embodiment, prescription verification engine 608 operates to compare the first prescription information against the second prescription information, for e.g., at Step 808. In one embodiment one or more of the first prescription information and the second prescription information is compared against a plurality of prescription information records available at prescription information database 612. Sorting verification system 600, by itself or in communication with server 502, or server 502 acting alone without input from sorting verification system 600, may direct the first function vehicle 112 to deposit a prescription drug container into the order receptacle (e.g., in the form of a prescription receptacle) based on the comparison at Step 810.

According to one or more embodiments, a system for use in directing a medication sorting operation such as sorting verification system 600 includes a server 502. Server 502 comprises a memory, a processor. Sorting verification system 600 further comprises a prescription verification engine such as prescription verification engine 608. In at least one embodiment, sortation engine 508 may be configured to additionally operate as prescription verification engine 608. Sorting verification system 600 further includes a plurality of first function vehicles traversing a first function platform for transporting and depositing prescription fluid containers into prescription receptacles. Sorting verification system 600 also includes first and second information acquisition devices electronically coupled to the server. Sorting verification system 600 is configured to: acquire, by the first information acquisition device, a first prescription information from a tag coupled to the prescription fluid container. Sorting verification system 600 is further configured to: receive, at the server, the first prescription information acquired by the first information acquisition device. Sorting verification system 600 is further configured to determine, by the server, a receptacle among a plurality of prescription receptacles for the first function vehicle to transport and deposit the prescription fluid container thereto based on the first prescription information. Sorting verification system 600 is further configured to acquire, by the second information acquisition device, a second prescription information from the tag coupled to the prescription fluid container. Sorting verification system 600 is also configured to receive, at the server, the second prescription information acquired by the second information acquisition device. Sorting verification system 600 is further configured to compare, by the sortation engine operating additionally as a prescription verification engine, the first prescription information against the second prescription information. Sorting verification system 600 is also configured to direct, by the server, the first function vehicle to deposit the prescription fluid container into the receptacle based on the comparison or the compare step.

According to one or more embodiments, a method of directing a medication sorting operation includes acquiring, by a first information acquisition device, of a first prescription information from a tag coupled to a prescription drug container. The method further includes receiving, at a server, of the first prescription information acquired by the first information acquisition device. The method further includes determining, by the server, of a receptacle among a plurality of prescription receptacles for a first function vehicle to transport and deposit the prescription drug container thereto based on the first prescription information. The method further includes acquiring, by a second information acquisition device, of a second prescription information from the tag coupled to the prescription drug container. The method further includes receiving, at the server, of the second prescription information acquired by the second information acquisition device. The method further includes comparing, by the sortation engine operating additionally as a prescription verification engine, of the first prescription information against the second prescription information. The method further includes directing, by the server, of the first function vehicle to deposit the prescription drug container into the receptacle based on the comparison.

In at least one embodiment, prescription information database 612 may contain a plurality of prescription information associated with all prescription drug containers 20*a* to be sorted by one or more of server 502, system 500 and sorting verification system 600. For example, in one embodiment, prior to the sorting of a batch of prescription drug containers 20*a*, one or more of server 502, system 500 and sorting verification system 600 shall be provided with electronic access to prescription information database 612. Stated differently, one or more of server 502, system 500 and sorting verification system 600 shall be in electronic communication with prescription information database 612 that contains a plurality of prescription information associated with all prescription drug containers 20*a* to be sorted by the one or more of server 502, system 500 and sorting verification system 600. Accordingly, in one embodiment, as part of sorting verification system 600 operating to verify sortation from start to end to ensure advantageously thereby 100% or close to 100% accuracy of sort to receptacles, at least one of the first prescription information and the second prescription information is compared against information present in prescription information database 612. In at least one embodiment, prescription information database 612 may have similar or same features as article information database 512.

In various embodiments, each of the sorting verification system 600 and the prescription verification engine operates to verify sortation from start to end to ensure advantageously thereby 100% or close to 100% accuracy of sort to receptacles. In one embodiment, positive sort or positive divert is confirmed by one or more of the following: (1) light curtain-when the light curtain is momentarily broken during a time window during which a tray of the computer-controlled vehicle is tilting at a location of receptacle, it confirms a divert; (2) photo eye-operates the same as light curtain, just with a less wide view as compared to the light curtain; (3) RFID Reader-detects the presence or absence of a specific item. An article to be sorted is provided with a complimenting RFID tag. This is a near—100% detection method, and when the expected result is not returned, the system or server generates an alert to the sorting verification system or to the general system; (4) camera at or near receptacle(s)—detects and identifies the article. When more than one articles are present on the vehicle, a camera may reliably detect the first article with high accuracy, but may have difficulty distinguishing the first article from the second when the second article is being diverted; (5) LIDAR (Light Detection and Ranging) sensor—this remote sensing method that uses light in the form of a pulsed laser to track presence or absence of articles on a tray of the computer-controlled vehicle; (6) Tray edge sensors provided on the tray of the computer-controlled vehicle (8) Camera provided under the tray of the computer-controlled vehicle—the camera may include a QR code or bar code reader; and (9) Camera provided under the chassis of the computer-controlled vehicle.

In various embodiments, a sorting verification system 600 operating by itself or in conjunction with system 500 or as a sub-part of system 500 includes RFID readers along the entire transport path of a sorting system such as system 500 or along the entire transport path of sorting verification system 600 or both as disclosed herein. In various embodiments, as illustrated in FIGS. 13-16, these RFID readers may take the form of an information acquisition device such as first information acquisition device 506 and second information acquisition device 507.

Figure 13:
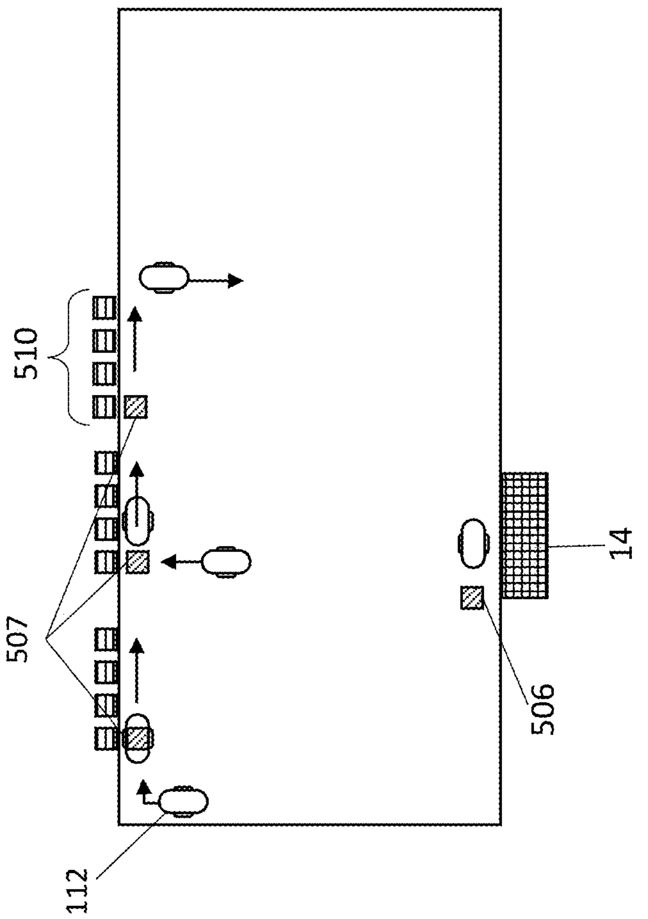
FIG. 13 illustrates a top schematic view of a portion of the first function platform of FIG. 12, according to at least one embodiment of the presently disclosed subject matter.

In one embodiment, each sub-group consisting of a predetermined number of sort receptacles is provided with its own dedicated information acquisition device, as shown for e.g., in the FIG. 13 embodiment; stated differently, an information acquisition device is provided for each sub-group of receptacles (such as one information acquisition device for a sub-group of first sort receptacles 510 or as one information acquisition device for a sub-group of second sort receptacles 511) as shown for example, in FIG. 13. In the embodiment shown in FIG. 13, each sub-group consisting of four first sort receptacles 510 is provided with its own dedicated second information acquisition device 507. In the FIG. 13 embodiment, a computer-controlled vehicle such as first function vehicle 112 (or second function vehicle 212) travels under or near a first information acquisition device 506 right after a prescription drug container 20*a* (or a first function article 20) is loaded onto the vehicle. The vehicle on which the prescription drug container 20*a* is loaded then travels under or near a second information acquisition device 507 that is assigned to, or is dedicated to, the sub-group of receptacles that a receptacle (e.g., first sort receptacle 510) selected or assigned by system 500 or by sorting verification system 600 for the deposition of the prescription drug container 20*a* loaded on the vehicle forms part of. It is to be noted that in the FIG. 13 embodiment, there is one information acquisition device assigned to a sub-group of receptacles that the selected receptacle forms part of in a one to four relationship. Server 502 or prescription verification engine 608 requires a 100% match or a 99% match or a similar percentage match between the prescription information captured or detected by first information acquisition device 506 and the prescription information captured or detected by second information acquisition device 507. In at least one embodiment, when the match is less than 100% (e.g., less than 99%, less than 90%, less than 80%, etc.) as detected or identified by server 502 or prescription verification engine 608, system 500 or sorting verification system 600 may generate an alert for intervention whereby a human operator or a robotic operator receives a prompt to investigate the reason for the lack of expected match threshold, and take any corrective action needed to prevent its re-occurrence.

Figure 14:
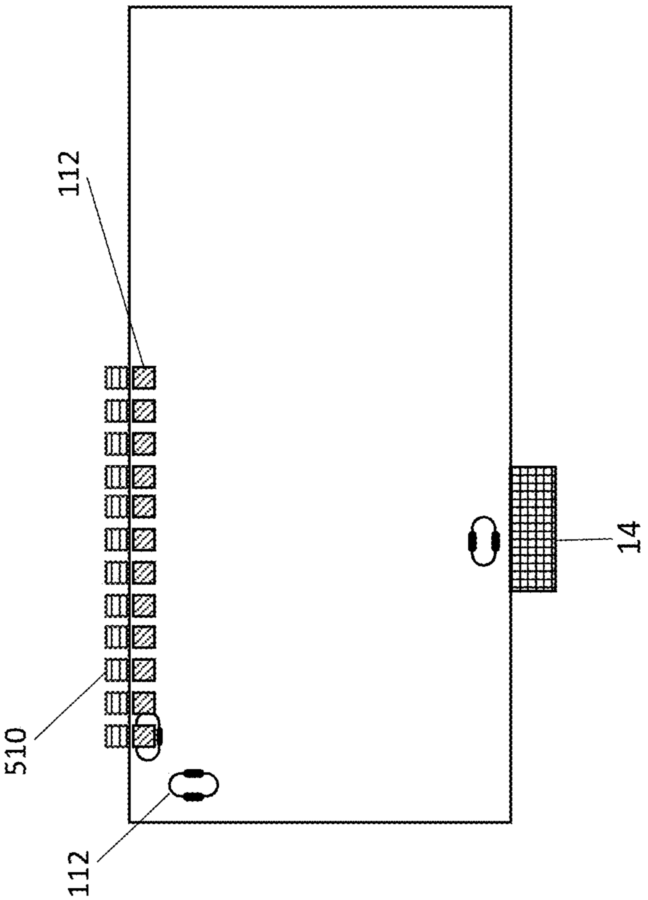
FIG. 14 illustrates a top schematic view of a portion of the first function platform of FIG. 12, according to at least one embodiment of the presently disclosed subject matter.

As shown in FIG. 14, in one embodiment, each sort receptacle is provided with its own dedicated information acquisition device; stated differently, an information acquisition device is provided at each receptacle (such as one for each first sort receptacles 510 or as one for each second sort receptacles 511). Thus, in the FIG. 14 embodiment, each first sort receptacle 510 is provided with its own dedicated second information acquisition device 507. In the FIG. 14 embodiment, a computer-controlled vehicle such as first function vehicle 112 (or second function vehicle 212), after a prescription drug container 20*a* (or a first function article 20) is loaded onto the computer-controlled vehicle, when enroute to a receptacle, travels under or near a second information acquisition device 507 that is assigned to, or is dedicated to, the receptacle (e.g., first sort receptacle 510) selected or assigned by system 500 or sorting verification system 600 for the deposition of the prescription drug container 20*a* loaded on the vehicle. It is to be noted that in the FIG. 14 embodiment, there is a one-to-one relationship between each information acquisition device and each receptacle; stated differently, each information acquisition device is assigned to one receptacle in a one to one relationship, and conversely each receptacle is assigned one information acquisition device. Server 502 or prescription verification engine 608 requires a 100% (or a percentage close to 100%) match between the prescription information captured or detected by second information acquisition device 507 the prescription information captured or detected by first information acquisition device 506 soon after or right before a specific prescription drug container 20*a* is loaded onto the vehicle. When the match is less than 100% (e.g., less than 99%, less than 90%, less than 80%, etc.), as detected or identified by server 502 or prescription verification engine 608 between the prescription information captured for the prescription drug container 20*a* by the second information acquisition device 507 assigned to a specific first sort receptacle 510 and the prescription information captured or detected by first information acquisition device 506, system 500 or sorting verification system 600 may generate an alert for intervention whereby a human operator or a robotic operator receives a prompt to investigate the reason for the lack of expected match threshold, and take any corrective action needed to prevent its re-occurrence.

In one embodiment, server 502 or prescription verification engine 608 requires a 100% (or a percentage close to 100%) match between the prescription information captured or detected by second information acquisition device 507 and the corresponding information available at prescription verification engine 608; in such an embodiment, prescription verification engine 608 may store information related to which specific prescription drug container 20*a* should be deposited into which specific receptacle. In at least one embodiment, when there the match is less than 100% (e.g., less than 99%, less than 90%, less than 80%, etc.), as detected or identified by server 502 or prescription verification engine 608 between the prescription information captured for the prescription drug container 20*a* by the second information acquisition device 507 assigned to a specific first sort receptacle 510 and the information stored at prescription verification engine 608 regarding the receptacle assigned for that specific prescription drug container 20*a* being carried on the specific vehicle, system 500 or sorting verification system 600 may generate an alert for intervention whereby a human operator or a robotic operator receives a prompt to investigate the reason for the lack of expected match threshold, and take any corrective action needed to prevent its re-occurrence.

Figure 15:
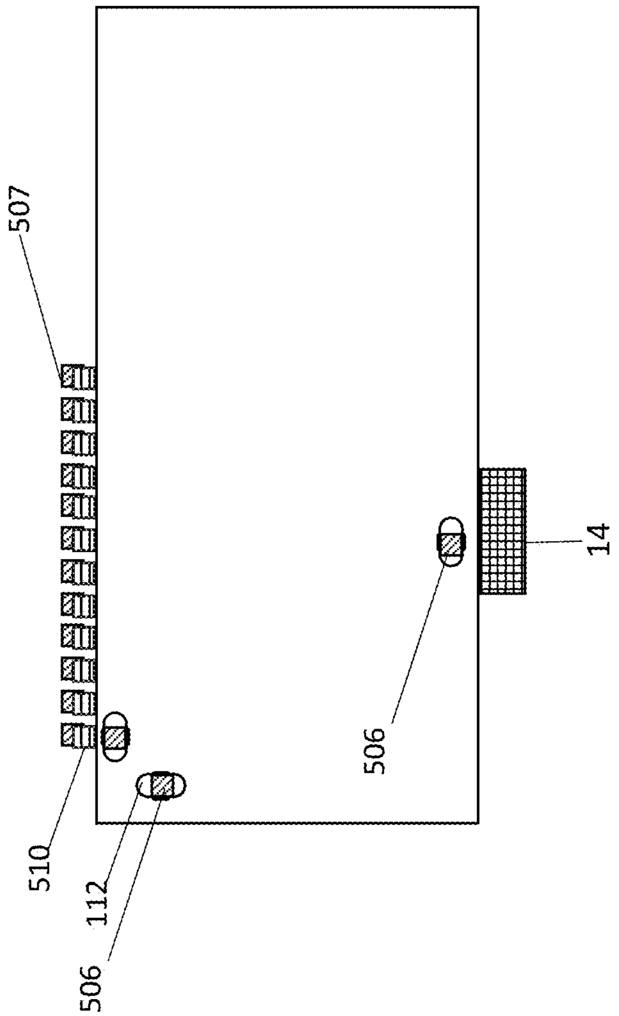
FIG. 15 illustrates a top schematic view of a portion of the first function platform of FIG. 12, according to at least one embodiment of the presently disclosed subject matter.

The FIG. 15 embodiment may be similar to the FIG. 14 embodiment except that a dedicated information acquisition device is provided inside every receptacle and on each vehicle (such as first function vehicle 112 or second function vehicle 212). Accordingly, in the FIG. 15 embodiment, each first sort receptacle 510 is provided with its own dedicated second information acquisition device 507 and each first function vehicle 112 is provided with its own dedicated first information acquisition device 506. In one embodiment, the information acquisition device such as first information acquisition device 506 is coupled to, i.e., provided at, near or under every robot tray, i.e., under the trays of each second function vehicle 212 and first function vehicle 112. In the FIG. 15 embodiment, prior to the deposition of the specific prescription drug container 20*a* into specific receptacle such as first sort receptacle 510, server 502 or prescription verification engine 608 requires a 100% match between the prescription information captured or detected by second information acquisition device 507 and the corresponding information captured or detected by first information acquisition device 506 coupled to first function vehicle 112. For example, a "first capture incident" may occur when first information acquisition device 506 present first function vehicle 112 captures the prescription information on a specific prescription drug container 20*a* at the instant the prescription drug container 20*a* is loaded onto first function vehicle 112 or immediately after prescription drug container 20*a* is loaded onto first function vehicle 112; a "second capture incident" may occur when second information acquisition device 507 servicing the specific first sort receptacle 510 (assigned for the deposition of the prescription drug container 20*a* being carried on the first function vehicle 112). In at least one embodiment, when there the match is less than 100% (e.g., less than 99%, less than 90%, less than 80%, etc.) between the prescription information captured in the first capture incident and the prescription information captured in the second capture incident, system 500 or sorting verification system 600 may generate an alert for an intervention whereby a human or robotic operator receives a prompt to investigate the reason for the lack of expected match threshold, and take any corrective action needed to prevent its re-occurrence.

In at least one embodiment, the first capture incident is scheduled simultaneous to or at the instant when first function vehicle 112 stops at or has neared the assigned receptacle into which the specific prescription drug container 20*a* is to be deposited into whereby the time interval between the first capture incident and the second capture incident is kept to a minimum, for e.g., 1, 2, 3, 4, 5 or 6 seconds or such similar short time interval. Providing for such a brief time interval between the first and second capture incidents may advantageously reduce, minimize or eliminate the chance of a prescription drug container 20*a* being diverted into or deposited into an incorrect receptacle (i.e., a receptacle different from the one assigned for the specific prescription drug container 20*a* being carried on the vehicle). In one embodiment, prescription verification engine 608 may store information regarding which specific receptacle a given prescription drug container 20*a* should be deposited into. In at least one embodiment, when the match is less than 100% (e.g., less than 99%, less than 90%, less than 80%, etc.) as detected or identified by server 502 or prescription verification engine 608 between the information captured during the first capture incident and the information captured during the second capture incident, system 500 or sorting verification system 600 may generate an alert for intervention whereby a human operator or a robotic operator receives a prompt to investigate the reason for the lack of expected match threshold, and take any corrective action needed to prevent its re-occurrence. Accordingly, in one embodiment, each pack station 555 and each vehicle is provided with its each own dedicated information acquisition device whereby the presence of every article at every stage along a sorting operation process can advantageously be verified, for e.g., by the prescription verification engine 608 forming part of system 500 or sorting verification system 600.

Figure 9:
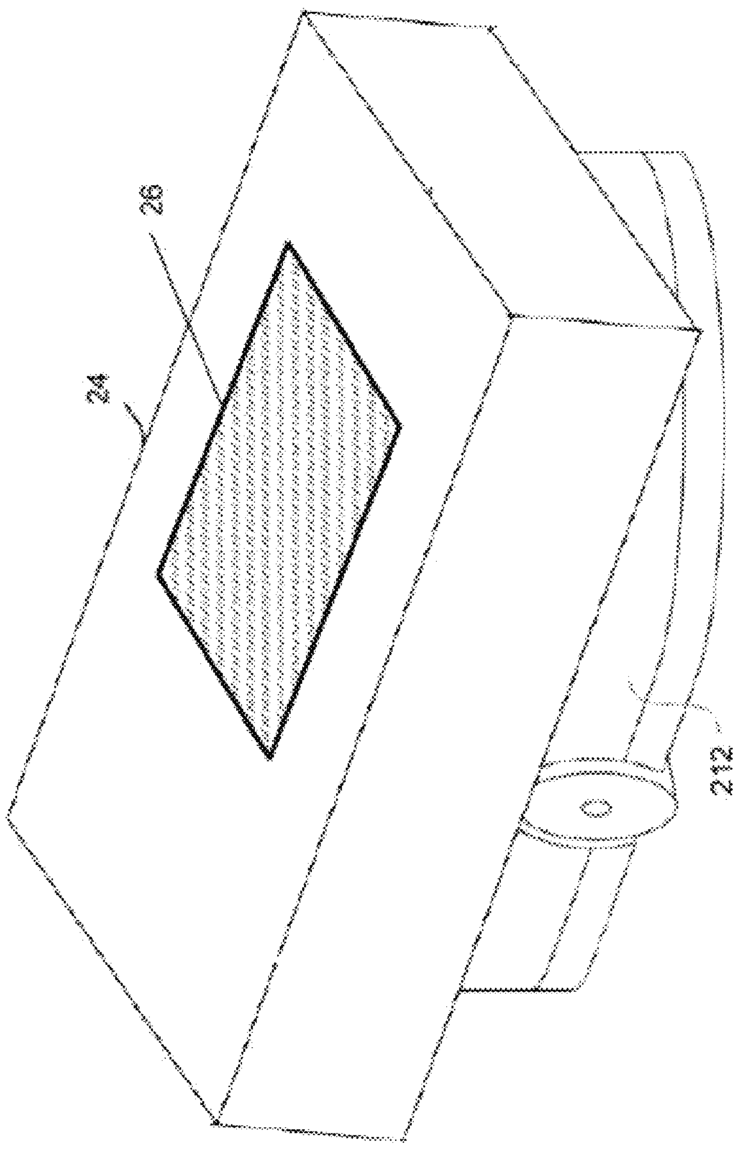
FIG. 9 illustrates a perspective view of a second function article in the form of a package with a label coupled thereto, wherein the package contains one or more articles, fluid containers, or prescription medication vials, according to at least one embodiment of the presently disclosed subject matter.
Figure 16:
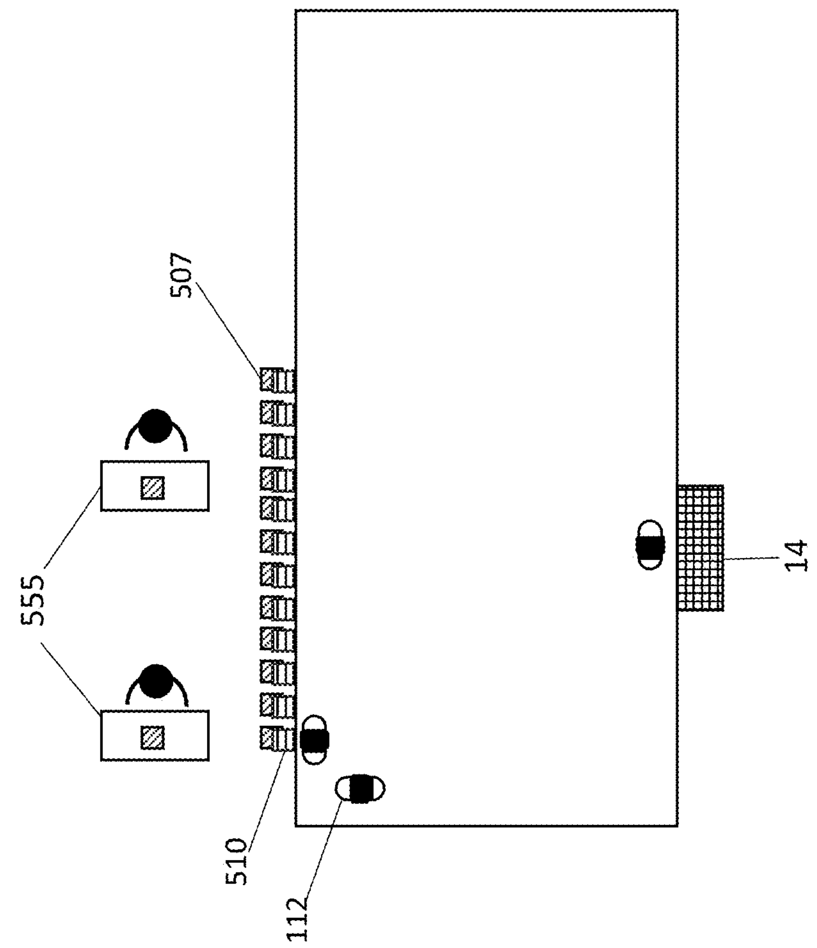
FIG. 16 illustrates a top schematic view of a portion of the first function platform of FIG. 12, according to at least one embodiment of the presently disclosed subject matter.

The FIG. 16 embodiment is similar to the FIG. 15 embodiment except that in the FIG. 16 embodiment, in addition each receptacle and each vehicle being provided with their respective information acquisition devices, each pack station 555 is provided with at least one information acquisition device. In at least one embodiment, system 500 or sorting verification system 600 further includes one or more packing stations 555 for consolidating a plurality of prescription fluid containers received at a receptacle such as first sort receptacles 510 into a package and adding address information to the package. In such an embodiment, one or more packing stations 555 may be positioned near a batch of first sort receptacles 510. Accordingly, in various embodiments, each of system 500 and sorting verification system 600 further comprises one or more packing stations 555 (shown in FIG. 16) for consolidating a plurality of first function articles 20 received at a first sort receptacle 510 into a single package to thereby result in a second function article 24 (see FIG. 9), and optionally for adding a label 26 including package information (e.g., a shipping or destination address) to the second function article 24 (see FIG. 9). As shown in FIG. 2, in some embodiments, system 500 or sorting verification system 600 may further comprise one or more sort shelf banks 32 wherein a crane or similar mechanism delivers the articles to receptacles on the shelf bank, thus providing vertical sorting capability along with horizontal sorting capability.

In at least one embodiment, system 500 or sorting verification system 600 includes a plurality of second function vehicles traversing a second platform, wherein the system is further configured to: assign, by the server, a package receptacle among a plurality of package receptacles for a second function vehicle to transport the package for deposition into the package receptacle. According to one or more embodiments, each of the plurality of package receptacles is associated with one of a: retail drug store, a physical hub, and a physical address. According to one or more embodiments, the second function vehicle is larger than the first function vehicle.

In one embodiment, the information acquisition device, e.g., in the form of a RFID reader, on first function vehicle is configured to read only one RFID tag. The information acquisition device reader at/near/under a receptacle, at a pack station, and on a second function vehicle is configured to read multiple RFID tags so that each of the RFID readers can confirm that all articles associated with an order are present. In one embodiment, the sorting verification system may advantageously be used for the sorting of highly valuable products or high-risk products such as jewelry, pharmaceuticals, and comparable products.

In one implementation, various aspects of the sorting verification system 600 are combined with various aspects of the multi-function sorting system such as system 500 for providing 100% verification or close to 100% verification at a central fill pharmacy application for fulfilling prescription orders. For example, in the pharmacy prescription order filling space, whereas retail pharmacies dispense controlled substances directly to the patient, central fill pharmacies (also referred to as refill pharmacies or fulfillment centers) may provide a service to retail pharmacies by preparing and packaging prescriptions for retail pharmacies to dispense to the patient. Further, large national pharmacy chains are moving to centralized prescription filling operations due to the high cost related to having pharmacists at local stores fill out individual prescription orders as compared to efficiencies gains accrued from centralizing filling of prescription orders that are then either delivered to homes of customers or picked up at the respective local pharmacy by customers. Small and medium retail pharmacy chains are re-examining their fill and dispense operations in the face of industry change that is challenging their traditional business model with several of them leaning towards the central fill approach used by large national pharmacy chains.

Fulfilling of prescription orders is a highly regulated industry for obvious reasons with regulatory compliance requirements stipulated, for example, by Health Insurance Portability and Accountability Act of 1996 ("HIPAA") in the US and similar other laws, rules and regulations adding unique complexities to centralized prescription filling operations that are not otherwise faced by central fill operations in other industries. A pharmacy considering central fill operations needs to ensure that business operating aspects such as pharmacy licenses, pharmacist licenses, patient care and prescription ownership are not negatively impacted by centralized consolidation of prescription fulfillment. Any errors in fulfilling prescription orders can lead to undesirable litigation and governmental inquiries, actions, and stiff fines. Accuracy is accordingly important in the field of fulfilling prescription orders, particularly as it relates to centralized automated fulfilling of prescription medications. Accordingly, a need exists for a solution that would permit an automated central fill pharmacy to operate in a reliable and cost-effective manner.

Whereas retail pharmacies dispense controlled substances directly to the patient, central fill pharmacies provide a service to retail pharmacies by preparing and packaging prescriptions for retail pharmacies to dispense to the patient. The biggest benefit from central fill operation is from automation of a major portion of the operations. However, any errors in fulfilling prescription orders can lead to undesirable litigation and governmental inquiries, actions, and stiff fines. Accuracy is accordingly important in the field of centralized automated fulfilling of prescription medications. The disclosure provided herein may advantageously aid in verification of automated fulfilling of prescription medications in centralized operations. According to one or more embodiments, the sorting verification system 600 is configured to: scan, by at least one of the first and second information acquisition devices, a top region of the first function vehicle to confirm that the prescription fluid container has been deposited into the prescription receptacle.

According to one or more embodiments, server 502 of sorting verification system 600 is configured to: receive, at the server, the first prescription information acquired by the first information acquisition device before the prescription fluid container is loaded onto the first function vehicle. According to one or more embodiments, the server of sorting verification system 600 is configured to: receive, at the server, the first prescription information acquired by the first information acquisition device after the prescription fluid container is loaded onto the first function vehicle.

According to one or more embodiments, the first prescription information is compared against the second prescription information prior to the prescription fluid container being deposited into the prescription receptacle. In one embodiment, the first prescription information is compared against the second prescription information soon after the prescription fluid container being deposited into the prescription receptacle; this set up may allow for the scanning of information as the prescription fluid container is being deposited into the prescription receptacle.

According to one or more embodiments, the server is further configured to associate an order with the prescription receptacle. According to one or more embodiments, the server is further configured to direct removal of the receptacle after completion of the order, and replacement with an empty prescription receptacle. According to one or more embodiments, the server is further configured for directing removal of the receptacle after completion of the order. According to one or more embodiments, the order comprises a plurality of prescription fluid containers. According to one or more embodiments, the server is further configured to direct affixing of an address information to the package. According to one or more embodiments, the second function platform is elevated as compared to the first platform. According to one or more embodiments, the second function platform is above the first function platform whereby the second function platform occupies the same or similar footprint as the first platform. According to one or more embodiments, the system further includes the tag comprises a RFID (Radio-frequency Identification) associated with the prescription fluid container.

According to one or more embodiments, sorting verification system 600 or system 500 is further configured to: subject, by the server, the first function vehicle carrying the prescription fluid container into a resolution routine when a discrepancy is identified during the comparing step. According to one or more embodiments, the first and second information acquisition devices are fixed in position. According to one or more embodiments, the second information acquisition device is shared by the plurality of prescription receptacles.

Embodiments of the presently disclosed subject matter provide for a solution that can permit an automated central fill multi-function sorter system to operate in a reliable and cost-effective manner. Embodiments disclosed herein can further provide for one or more of: detection, correction, reduction, and elimination of errors in automated fulfilling of prescription orders. Embodiments disclosed herein can accordingly provide for improved accuracy in automated fulfilling of prescription orders than what is possible under existing methods. Embodiments disclosed herein can further provide for an improved automation solution by way of a prescription order consolidation and shipping sortation in one combined footprint.

In at least one embodiment, the first function sorting system is configured for a first sorting task, and the second function sorting system 504 is configured for a second sorting task. For example, in at least one embodiment, the first function sorting system is configured for order consolidation. In at least one embodiment, the second function sorting system 504 is configured for consolidating each order into a parcel. In at least one embodiment, the first function sorting system is configured for order consolidation, and the second function sorting system 504 is configured for consolidating for parcel sortation. In at least one embodiment, the first function sorting system is configured for store pick-up ecommerce sortation, and the second function sorting system 504 is configured for store replenishment. In at least one embodiment, the first function sorting system is configured for sorting of articles with size above a threshold value, and the second function sorting system 504 is configured for sorting of articles with size below a threshold value. In at least one embodiment, the first function sorting system is configured for sorting of fragile articles, and the second function sorting system 504 is configured for sorting of non-fragile articles. In at least one embodiment, the first function sorting system is configured for sorting of articles to be consolidated into kits, and the second function sorting system 504 is configured for parcel sortation.

In at least one embodiment, the first function sorting system is configured for sorting of articles to be assembled into a finished product, and the second function sorting system 504 is configured for parcel sortation. In at least one embodiment, the first function sorting system is configured for sorting of articles into a route stop sequence, and the second function sorting system 504 is configured for sorting of the output of the first function sorting system to a route comprising the route stop sequence. In at least one embodiment, the first function sorting system is configured for sorting of articles comprising consumer goods such as, for example, apparel to an automated packing machine, and the second function sorting system 504 is configured for sorting of the output of the first function sorting system to one of shipping containers and gaylords.

In at least one embodiment, the first function sorting system 503 is configured for sorting of articles above a threshold size, and the second function sorting system 504 is configured for sorting of articles below a threshold size article, and outputs of the first function sorting system 503 and second function sorting system 504 are combined and provided to a third function sorting system. In at least one embodiment, the first function sorting system is configured for sorting of articles above a threshold size, and the second function sorting system 504 is configured for sorting of articles below a threshold size article, wherein outputs of the first function sorting system 503 and second function sorting system 504 are provided for output to a put wall.

In at least one embodiment, the multi-function sorting system is configured for calculating cubic footage of all articles present in each of the first sort receptacles and in each of the second sort receptacles.

In at least one embodiment, outputs of first function sorting system 503 and second function sorting system 504 are provided for output to a conveyor or a lift for delivery to a third function sorting system. In at least one embodiment, outputs of first function sorting system 503 and second function sorting system 504 are provided for output to a single belt conveyor for delivery to an induction lift for delivery to a third function sorting system configured for parcel sorting. In at least one embodiment, outputs of first function sorting system 503 and second function sorting system 504 are provided for output to a single belt conveyor provided near the floor for delivery to an automated packing machine.

In at least one embodiment, an output of the automated packing machine is input into an induction lift for delivery to a third function sorting system configured for parcel sorting. In at least one embodiment, an output of the first function sorting system is input into an induction lift for delivery to a third function sorting system positioned at an upper level for parcel sorting.

In at least one embodiment, the first function sorting system 503 is configured for item sortation, wherein the second function sorting system 504 is configured for parcel sortation, wherein an output of the first function sorting system is provided as an input to the second function sorting system 504, and wherein an output of the second function sorting system 504 is provided as input to an automated packing machine.

In at least one embodiment, an output of the first function sorting system 503 is input into an induction lift for delivery to one of: the second function sorting system 504 configured for ecommerce order fulfillment, and a third function sorting system configured for store replenishment.

In at least one embodiment, the third function sorting system is positioned above or below one of: the first function sorting system 503 and the second function sorting system 504. In at least one embodiment, the third function sorting system is positioned adjacent to the first function sorting system or the second function sorting system 504.

In at least one embodiment, the system further comprises: a light curtain provided at or near one or of: the first sort receptacles, and the second sort receptacles. In at least one embodiment, the system further comprises: a light curtain provided at one or more of: the first function vehicles, and the second function vehicles.

In one embodiment, the multi-function sorter system includes (1) an order consolidation system, and (2) a parcel sortation system. In one embodiment, the multi-function sorter system includes store pick-up ecommerce sortation and store replenishment. In one embodiment, the "multi-function" sorter system further includes two systems doing different tasks in the same footprint. In one embodiment, the multi-function sorter system includes large item sortation and small item sortation. In one embodiment, the multi-function sorter system includes fragile item sortation and non-fragile sortation. In one embodiment, the multi-function sorter system includes kitting or assembly and parcel sortation. In one embodiment, the multi-function sorter system includes sort to route stop sequence then sort to route (e.g., sequencing parcel sorter). In one embodiment, the multi-function sorter system includes t-sort sorting consumer goods to an automated packing machine (e.g., a polybag) and then to shipping containers or gaylords.

In one embodiment, the multi-function sorter system includes two sorters' outputs flowing into one sorter integrated at the other end of the two sorters (for e.g., third sorter adjacent to the 2nd sorter). In one embodiment, the multi-function sorter system further includes unit sortation of different product sizes are performed on a two-level sorter which feeds directly into an adjacent parcel sorter.

In one embodiment, the multi-function sorter system advantageously includes a sequencing sorter. In one embodiment, the multi-function sorter operates to sort an item to a 3D sorter at a bottom level. Then a conveyor or lift operates to move the item to a further sorting system such as, for e.g., carried to the top to be inducted into a 3rd system. In case of an automated packing machine, a conveyor or lift operates to lift the item to 2nd level for parcel.

In one embodiment, the multi-function sorter system includes a single belt at the bottom plus induction lift whereby an operator scoots a parcel just after being packed onto the belt and the induction lift takes it to the parcel sort level.

In one embodiment, the multi-function sorter system includes multi-level induction whereby items or articles are inducted to vertical sorting system. The lift takes the item to a certain level (e.g., a 2$^{nd}$ level, a 3$^{rd}$ level, a 4$^{th}$ level, etc.) based on the type of sort required (e.g., an ecommerce sort versus a store replenishment sort).

In one embodiment, the multi-function sorter system includes: (1) item sortation, (2) packing sortation, and (3) bagging.

Embodiments of multi-function sorter system disclosed herein overcome the limitation by providing for a two-system single footprint. Benefits of the multi-function sorter include: (1) space savings, (2) operational and resource efficiency, (3) elimination of extra equipment or labor (no additional conveyor belts to move articles from one system to another, etc.), (4) minimizing of operator movement, (5) time savings, (6) cost savings (for e.g., no investment needed for equipment connecting both systems).

FIG. 1 depicts a block diagram of an exemplary implementation of system 500, wherein several of its components are depicted in a representative manner as blocks representing a generic descriptor of the technology. Server 502 is a control server that is configured for communicating with one or more components of system 500 as described herein, and as shown, for example, in FIG. 1. In one implementation, server 502 includes memory, a processor, and/or one or more communication interfaces communicatively coupled to each other. A network may form part of system 500, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, first information acquisition devices 506, second information acquisition devices 507, wireless access point 514, first function vehicle 112, second function vehicle 212, and server 502 may communicate over the network with the cloud. In some implementations, one or more components of system 500 may reside in the cloud. For example, in one implementation, server 502 may reside in the cloud. In at least one implementation, server 502 may be in communication with one or more third-party servers, such as warehouse management system servers and automated vehicle operations control servers.

FIG. 12 depicts a block diagram of an exemplary implementation of sorting verification system 600, wherein several of its components are depicted in a representative manner as blocks representing a generic descriptor of the technology. Components of sorting verification system 600 with the same numerical designations as system 500 have the same features or similar features as that of the parallel components of system 500 having the same numerical designations. Server 502 is a control server that is configured for communicating with one or more components of sorting verification system 600 as described herein, and as shown, for example, in FIG. 12. In one implementation, server 502 includes memory, a processor, and/or one or more communication interfaces communicatively coupled to each other. A network may form part of sorting verification system 600, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, prescription verification engine 608, prescription information database 612, first information acquisition devices 506, second information acquisition devices 507, wireless access point 514, first function vehicle 112, second function vehicle 212, and server 502 may communicate over the network with the cloud. In some implementations, one or more components of sorting verification system 600 may reside in the cloud. For example, in one implementation, server 502 may reside in the cloud. In at least one implementation, server 502 may be in communication with one or more third-party servers, such as warehouse management system servers and automated vehicle operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network-typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions of a traditional physical server including delivering processing power, storage, and applications. One of the advantages of cloud storage is that there are many distributed resources acting as one-often called federated storage clouds. This makes the cloud very tolerant of faults, due to the distribution of data. Use of the cloud can reduce the creation of different versions of files, due to shared access to documents, files, and data.

Each of the components shown in FIGS. 1-16 may be in communication with one or more other components through a wired and/or a wireless network. For example, the cloud, the server 502 may communicate with sorting verification system 600, sortation engine 508, prescription verification engine 608, sortation engine 508 acting additionally as a prescription verification engine, article information database 512, prescription information database 612, first information acquisition devices 506, second information acquisition devices 507, first function vehicle 112, second function vehicle 212, packing station 555, and wireless access point 514 over a network.

As mentioned herein, the term "prescription drug container" may include any item sold at or by a pharmaceutical store and is not necessarily limited only to sale of medicament, prescription-based or otherwise. The term "prescription drug container" can accordingly include an item of business, a thing of a particular and distinctive kind or class, a member of a class of things, an item of goods, and similar other items. In various embodiments, a prescription drug container may comprise one or more of: a case, a container, an item, a parcel, and a bag. In various embodiments, the term "prescription drug container" may comprise a plurality of articles associated with a multiple-order batch. In various embodiments, the prescription drug container supply location may comprise one of: a retail store, a fully or partially automated retail order fulfillment store, and a local fulfilment center. Embodiments as disclosed herein may be advantageously installed in retail supercenters, warehouses, grocery stores, mall anchors, club warehouses, or any large format retail store or pharmacy store setting.

First and second information acquisition devices may acquire the prescription information of the prescription drug containers to be delivered and sorted in numerous ways. At the induction station, an information acquisition device interacts with an identifier present on tag 22*a* or on the prescription drug container itself. The identifier may be a barcode; alternately, the identifier may be a similar other unique identification code, such as a UPC code, QR code or RFID tag. Information acquisition device is positioned proximate to first function platform 16. In one embodiment, information acquisition device is a UPC scanner; in an alternate embodiment, information acquisition device may be carried by, and operated by, a person, i.e., information acquisition device may not be fixedly positioned. In a further embodiment, each first function vehicle may include a scannable code such that when a prescription drug container is placed thereon, the information acquisition device scans both the UPC on the prescription drug container and the scannable code on the first function vehicle to determine which prescription drug container is associated with which vehicle. Alternatively, the first function vehicle may include an information acquisition device mounted thereon for imaging the code or identifier present on or about the prescription drug container. In such embodiments, both the first prescription information and the second prescription information are captured by the same device but at separate times-first right after induction and the second right before deposition into the prescription receptacle. All these identification devices may be RFID tags, other types of bar codes, or any other type of item and vehicle recognition methods. In some embodiments, the information code may be a bar code, a two-dimensional code, a radio frequency tag etc., and correspondingly, the information acquisition device may be a bar code scanner, a two-dimensional code scanner, a radio frequency identifier, etc. According to actual demands, in addition to the destination, the prescription information may further include information about the prescription drug container or article volume, weight, appearance etc., and correspondingly, the information acquisition device may further include a weighing device, a volume scanner, a camera, etc.

Server 502 may operate to complete an analytical processing of the obtained prescription information of all the prescription drug containers to be delivered and sorted, thereby obtaining the destination information of the respective assigned prescription receptacles to which these prescription drug containers need to be delivered to. Server 502 is in electronic communication with all the information acquisition devices so as to obtain the prescription information acquired by all the information acquisition devices, to obtain the destinations of the respective assigned prescription receptacles to which these prescription drug containers need to be delivered to. In one embodiment, system 500 or server 502 are supplied with a relational database listing various sets of features to be considered by a real time optimization algorithm operating on sortation engine 508 operating additionally as a prescription verification engine for purposes of optimizing delivery of the prescription drug containers or packages. The relational database may include, among others, information such as delivery address, delivery stop, delivery route, and delivery preferences, associated with each prescription drug container or each package.

Server 502 as described herein can be a controller that can be used in conjunction with all kinds of compatible sortation devices, techniques, and systems, including those as described above. Accordingly, it is reiterated that the descriptions of the various embodiments of the present invention have been presented for purposes of illustration but are not intended to be exhaustive or limited to the embodiments disclosed.

In some embodiments, one of system 500 and sorting verification system 600 further includes a detection device and a transfer device, wherein the detection device is configured to detect whether a receptacle or package receptacle is full or not and to transmit to server 502 the obtained information regarding whether the receptacle is full or not, and the transfer device is configured to transfer the storage device which is full according to an instruction from the server 502. There are many options for the transfer device, e.g., an intelligent robot; and for another example, the storage device is mounted on the transfer device, and the transfer device is a large-scale auto-navigating vehicle and may move to a position and load and unload the articles according to the control instruction of the server 502.

In at least one embodiment, when server 502 determines that a customer's prescription order or a retail pharmacy store's order has been completed, server 502 updates an electronic database to reflect this, with server 502 being in electronic communication with the electronic database. In one embodiment, the electronic database may reside in the cloud. According to at least one embodiment, each time first function vehicle or second function vehicle deposits an item into a receptacle, server 502 may update the status of the order in the electronic database.

According to one or more embodiments, server 502 is further configured to determine a characteristic of one of the prescription drug containers by interacting with the prescription drug container with the information acquisition device. The characteristics include one of size, color, deformation, or another defect of the prescription drug container.

Embodiments described herein may accordingly provide for a solution that meets patient needs; minimizes the cost of quick response prescription fulfillment; and efficiently manages inventory. Embodiments disclosed herein can be rapidly deployed and modified. Embodiments described herein may operate to eliminate lead time while reducing cost, complexity, and space and simultaneously enabling more flexibility, modular growth, operating cost savings, and simplicity. One of system 500 and sorting verification system 600 may further include high volume autofill options. Embodiments disclosed herein may advantageously be used by: central fill pharmacies (also referred to as refill pharmacies or fulfillment centers) that provide a service to retail pharmacies by preparing and packaging prescriptions for retail pharmacies to dispense to the patient, and by large national pharmacy chains to improve efficiencies gains accrued from centralizing filling of prescription orders that are then either delivered to homes of customers or picked up at the respective local pharmacy by customers.

As to the above, they are merely specific embodiments of the present invention; however, the scope of protection of the present invention is not limited thereto, and within the disclosed technical scope of the present invention, any modifications, or substitutions that a person skilled in the art could readily conceive of should fall within the scope of protection of the present invention. Thus, the scope of protection of the present invention shall be determined by the scope of protection of the appended claims.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated vehicle set up meant for transporting or transferring articles of disparate sizes. For instance, the disclosed apparatus and method would also be applicable for pick assist robot applications. Similarly, the disclosure here is also relevant to lifting robots and several other types of robots used in warehouse and material handling facility applications.

What is claimed is:

1. A multi-function sorting system for use in a sorting operation, the system comprising:

a server comprising a memory, a processor, and a sortation engine, a first function sorting system for sorting articles, comprising:

a plurality of first function vehicles traversing a first function platform for transporting and depositing first function articles into first sort receptacles; and a first function article information acquisition device electronically coupled to the server;

a second function sorting system for sorting articles, comprising:

a plurality of second function vehicles different from the first function vehicles traversing a second function platform spaced apart from the first function platform for transporting and depositing second function articles different from the first function articles into second sort receptacles different from the first function sort receptacles; and wherein the second function platform is arranged above the first function platform in a vertical stacked configuration.

2. The system of claim 1, wherein an output of the first function sorting system is provided as an input to the second function sorting system; or, wherein an output of the second function sorting system is provided as an input to the first function sorting system.

3. The system of claim 1, wherein the first function sorting system is configured for order consolidation.

4. The system of claim 1, wherein the second function sorting system is configured for consolidating for parcel sortation.

5. The system of claim 1, wherein the first function sorting system is configured for store pick-up ecommerce sortation, and wherein the second function sorting system is configured for store replenishment sortation.

6. The system of claim 1, wherein the first function sorting system is configured for sorting of consumer goods to an automated packing machine, and wherein the second function sorting system is configured for sorting of an output of the automated packing machine to one of: shipping containers and gaylords.

7. The system of claim 1, wherein an output of the first function sorting system and an output of the second function sorting system are combined and provided as an input to a third function sorting system.

8. The system of claim 1, wherein outputs of one or more of the first and second function sorting systems are provided as an input to a third function sorting system.

9. The system of claim 1, wherein the first function sorting system is configured for sorting of articles above a threshold size, wherein the second function sorting system is configured for sorting of articles below the threshold size.

10. The system of claim 1, wherein outputs of one or more of the first and second function sorting systems are provided as an input to a wall of sorting cubbies for an operator to transfer all articles associated with each customer order to a respective sorting cubby.

11. The system of claim 1, wherein outputs of one or more of the first and second function sorting systems are provided as an input to a conveyor or a lift for delivery to a third function sorting system.

12. The system of claim 1, wherein outputs of one or more of the first and second function sorting systems are provided as an input to an induction lift for delivery to a third function sorting system.

13. The system of claim 1, wherein outputs one or more of the first and second function sorting systems are provided as an input to a single belt conveyor positioned adjacent to a floor level for delivery to an automated packing machine.

14. The system of claim 13, wherein an output of the automated packing machine is provided as an input to a lift for delivery to a third function sorting system configured for parcel sorting.

15. The system of claim 1, wherein the first function sorting system is configured for item sortation, wherein the second function sorting system is configured for parcel sortation, wherein an output of the first function sorting system is provided as an input to the second function sorting system, and wherein an output of the second function sorting system is provided as input to an automated packing machine.

16. The system of claim 1, wherein an output of the first function sorting system is provided as an input to a lift for delivery to the second function sorting system configured for ecommerce order fulfillment.

17. The system of claim 1, wherein outputs of one or more of the first and second function sorting systems are provided as an input to a lift for delivery to a third function sorting system configured for store replenishment.

18. The system of claim 1, further comprising a light curtain provided at one or more of: the first sort receptacles, the second sort receptacles, the first function vehicles, and the second function vehicles.

19. The system of claim 1, wherein the second function sorting system further comprises a second function article information acquisition device electronically coupled to the server.

* * * * *